US006853935B2

(12) United States Patent
Satoh et al.

(10) Patent No.: US 6,853,935 B2
(45) Date of Patent: Feb. 8, 2005

(54) INFORMATION PROCESSING APPARATUS, MIXED REALITY PRESENTATION APPARATUS, METHOD THEREOF, AND STORAGE MEDIUM

(75) Inventors: Kiyohide Satoh, Kanagawa (JP); Mahoro Anabuki, Kanagawa (JP); Toshikazu Ohshima, Kanagawa (JP); Shinji Uchiyama, Kanagawa (JP); Kazuki Takemoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/818,600

(22) Filed: Mar. 28, 2001

(65) Prior Publication Data

US 2002/0095265 A1 Jul. 18, 2002

(30) Foreign Application Priority Data

Nov. 30, 2000 (JP) ....................................... 2000-364231
Feb. 26, 2001 (JP) ....................................... 2001-050990

(51) Int. Cl.[7] ................................................ G01C 17/38
(52) U.S. Cl. ......................................................... 702/94
(58) Field of Search ............................ 702/94, 95, 150; 463/30, 20, 6; 345/6, 419, 619, 646, 629, 8, 156, 679; 382/154; 342/257

(56) References Cited

U.S. PATENT DOCUMENTS

| | | | | | |
|---|---|---|---|---|---|
| 5,790,099 | A | | 8/1998 | Okada | |
| 5,956,660 | A | * | 9/1999 | Neumann | 702/150 |
| 6,124,825 | A | * | 9/2000 | Eschenbach | 342/257.08 |
| 6,166,744 | A | * | 12/2000 | Jaszlics et al. | 345/629 |
| 6,285,959 | B1 | * | 9/2001 | Greer | 702/95 |
| 6,330,356 | B1 | * | 12/2001 | Sundareswaran et al. | 382/154 |
| 6,522,312 | B2 | * | 2/2003 | Ohshima et al. | 345/8 |
| 6,525,699 | B1 | * | 2/2003 | Suyama et al. | 345/6 |
| 2002/0075286 | A1 | * | 6/2002 | Yonezawa et al. | 345/679 |
| 2002/0084974 | A1 | * | 7/2002 | Ohshima et al. | 345/156 |
| 2002/0171666 | A1 | * | 11/2002 | Endo et al. | 345/619 |

FOREIGN PATENT DOCUMENTS

| | | |
|---|---|---|
| JP | 7-064709 | 3/1995 |
| JP | 7-333551 | 12/1995 |
| JP | 8-030380 | 2/1996 |
| JP | 11-136706 | 5/1999 |
| JP | 2000-102036 | 4/2000 |
| JP | 2000-330709 | 11/2000 |

OTHER PUBLICATIONS

Hirokazu Kato, et al, "An Augmented Reality System and its Calibration Based on Marker Tracking", Journal of Japanese Virtual Reality Assocation, Japanese Virtual Reality Association, Dec. 1999, vol. 4, No. 4, pp. 607–616.

* cited by examiner

*Primary Examiner*—John Barlow
*Assistant Examiner*—Tung Lau
(74) *Attorney, Agent, or Firm*—Fitzpatrick, Cella, Harper & Scinto

(57) ABSTRACT

A view transformation matrix that represents the position/attitude of an HMD is generated based on a signal that represents the position/attitude of the HMD (S602). On the other hand, landmarks and their locations are detected based on a captured picture (S604) and a calibration matrix ΔMc is generated using the detected locations of the landmarks (S605). The position/attitude of the HMD is calibrated using the view transformation matrix and calibration matrix ΔMc generated by the above processes (S606), a picture of a virtual object is generated based on external parameters that represent the position/attitude of the calibrated HMD, and a mixed reality picture is generated (S607). The generated mixed reality picture is displayed in the display section (S609).

18 Claims, 20 Drawing Sheets

INFORMATION PROCESSING APPARATUS, MIXED REALITY PRESENTATION APPARATUS, METHOD THEREOF, AND STORAGE MEDIUM

FIELD OF THE INVENTION

The present invention relates to an information processing apparatus that derives the calibration information needed to measure the position and/or attitude of a measuring object based on the output values of a position and/or attitude sensor, a mixed reality presentation apparatus that displays virtual space superimposed over a picture of captured real space on a display screen or displays virtual space superimposed over the real space transmitted optically through a display screen, a method thereof, and a storage medium.

BACKGROUND OF THE INVENTION

Recently, studies have been conducted actively on mixed reality (hereinafter abbreviated to MR). MR aims at seamless connection between real space and virtual space. It is an important technique in virtual reality (hereinafter abbreviated to VR).

MR aims at coexistence of real space and a VR world which can conventionally be experienced only in situations isolated from real space. It attracts attention as a technique for enhancing VR.

MR includes video see-through mode that involves superimposing a picture of virtual space (for example, virtual objects drawn by computer graphics (hereinafter abbreviated to CG) or text information) over a picture of captured real space captured by an imaging apparatus such as a video camera, and optical see-through mode that involves superimposing a picture of virtual space over a picture of the real space transmitted optically through a display screen.

MR is expected to find applications in medical aids which will show the inside of the patient's body to the surgeon as if it were transparent, applications in work aids which will show assembly procedures of a product superimposed over the actual objects in a factory, and other applications totally different in quality from those of conventional VR.

What is commonly required of these applications is a technique for aligning the position/attitude of real space and virtual space and many attempts have been made so far.

The problem of position/attitude alignment in video see-through mode MR resolves itself down to a matter of finding the 3D position/attitude of a video camera in a global coordinate system set up in real space (hereinafter referred to simply as a global coordinate system). Similarly, the problem of position/attitude alignment in optical see-through mode MR comes down to a matter of finding the 3D position/attitude of the user's viewpoint.

As a method of solving these problems, it is common practice to derive the 3D position/attitude of the video camera's or user+s viewpoint in a global coordinate system by using a 3D position/attitude sensor such as a magnetic sensor or ultrasonic sensor.

The output values of a sensor represent, in the case of a magnetic sensor, for example, the 3D position/attitude of the sensor itself in the sensor coordinate system whose center is defined as the source of an AC magnetic field described later, and not the 3D position/attitude of the video camera's or user's viewpoint in a global coordinate system being measured. In other words, the output values of the sensor cannot be used directly as the 3D position/attitude of the video camera's or user's viewpoint, but some coordinate transformation is necessary. Hereinafter the data needed for coordinate transformation between the output values of the sensor and the 3D position/attitude of the video camera's or user's viewpoint will be referred to as calibration data (calibration information). Also, the process of setting or calculating calibration data beforehand will be referred to as calibration. Only after accurate calibration is performed, the output of a 3D position/attitude sensor can be converted to the 3D position/attitude of the video camera's or user's viewpoint and accurate position/attitude alignment in MR can be performed.

Conventionally, however, it is difficult to:

acquire the position/attitude (the information needed to convert sensor output to the 3D position/attitude of the sensor in a global coordinate system) of the sensor coordinate system in a global coordinate system, and acquire the position/attitude (the information needed to transform the position/attitude of the sensor into the position/attitude of the measuring object) of the measuring object (camera's or user's viewpoint) as viewed from the sensor.

The present invention has been made in view of the above problems. Its object is to acquire the information needed to transform a sensor coordinate system into a global coordinate system and the information needed to transform the position/attitude of a sensor into the position/attitude of a measuring object.

SUMMARY OF THE INVENTION

To achieve the object of the present invention, an information processing apparatus according to the present invention, for example, has the following configuration.

Specifically, it is an information processing apparatus that derives the calibration information needed to measure the position and/or attitude of a measuring object based on the output values of a position and/or attitude sensor, comprising:

input means for entering information about a match between the position and/or attitude of the above described measuring object and a predetermined position and/or attitude;

acquisition means for acquiring the output values from the above described position and/or attitude sensor according to the input by the above described input means; and operation means for deriving the above described calibration information, based on the above described predetermined position and/or attitude and the output values of the above described position and/or attitude sensor acquired by the above described acquisition means.

To achieve the object of the present invention, a mixed reality presentation apparatus according to the present invention, for example, has the following configuration.

Specifically, it is a mixed reality presentation apparatus that displays virtual space superimposed over a picture of captured real space on a display screen or displays virtual space superimposed over the real space transmitted optically through a display screen based on output values of a position and/or attitude sensor, comprising:

an information processing apparatus recited in any of claims 10 to 16; and switching means for switching between presentation mode that presents mixed reality and derivation mode that derives calibration information; wherein the calibration information needed for presentation of the above described mixed reality is derived in the above described derivation mode and mixed reality is presented using the calibration information in the above described presentation mode.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[First Embodiment]

Now detailed description will be given about cases in which the information processing apparatus and method thereof according to the present invention are applied to the calibration apparatus and method thereof for the calibration of a game device, and furthermore, for example, to an air hockey game device that utilizes MR technology.

The air hockey game is a game which is played between two opposing players who try to score goals by shooting a puck floated by compressed air supplied from below, into the opponent's cage. The one who scores more goals wins. In the air hockey game that uses the MR technology of this embodiment, the puck is presented as a virtual 3D image superimposed over a table in the real environment to the players, who compete to hit it with real mallets.

<Configuration of the Game Device>

Figure 1:
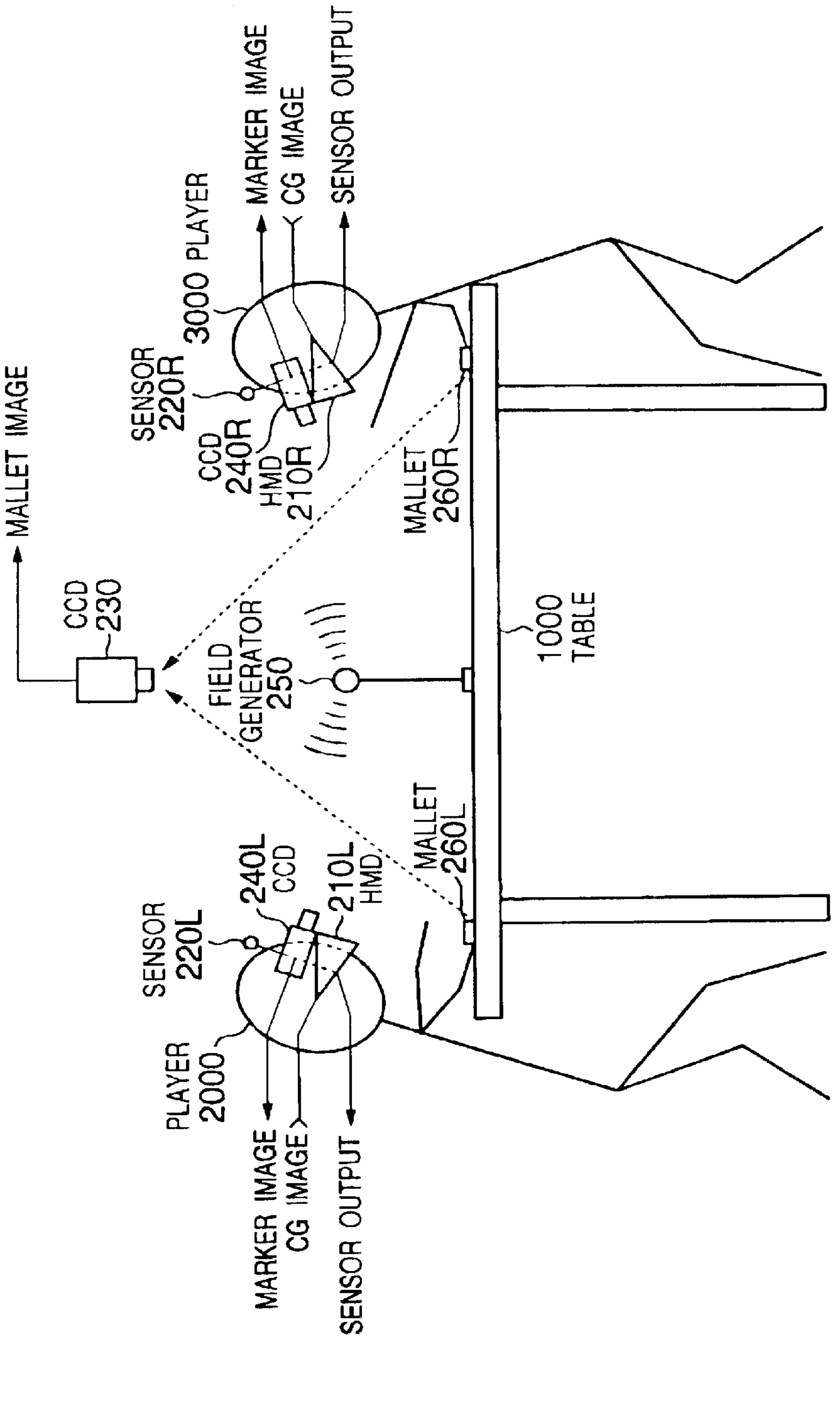
FIG. 1 is a side view of the game device of the system according to a first embodiment of the present invention.

FIG. 1 is a side view of the game device of the system according to this embodiment. In the air hockey game that uses the MR technology, two players 2000 and 3000 face each other across a table 1000 with a mallet (260L or 260R) in their hand. The two players 2000 and 3000 wear head-mounted displays 210L and 210R (hereinafter abbreviated to HMD), respectively, on their head. The mallets (260L and 260 R) of this embodiment have an infrared emitter at their tip. The infrared rays emitted from the infrared emitter are used to detect the positions of the mallets. Details will be described later. Incidentally, if the mallets have distinctive shapes or colors, their positions may be detected through pattern recognition using these distinctive features.

Figure 3:
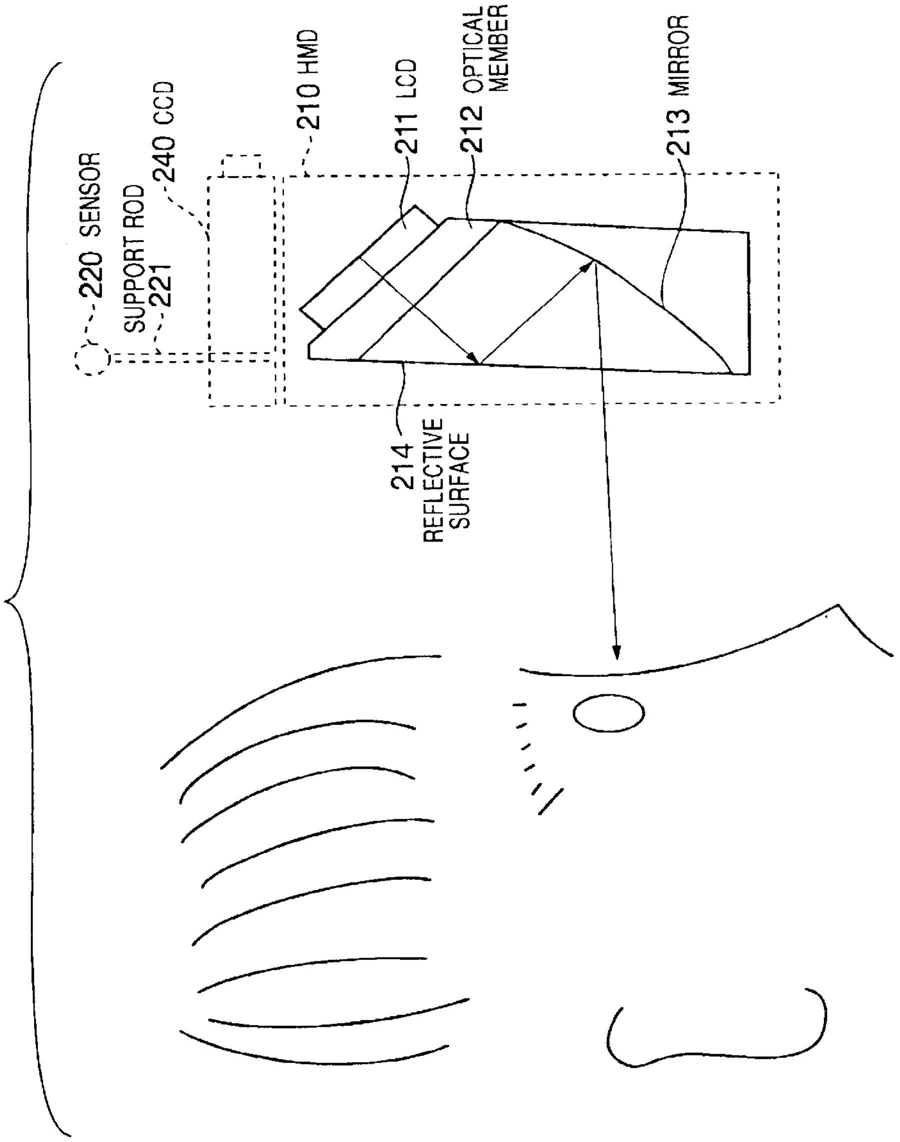
FIG. 3 is a drawing showing the configuration of HMD 210.

The HMDs 210L and 210R of this embodiment are a see-through type as shown in FIG. 3. They will be described in detail later. The two players 2000 and 3000 can see the surface of the table even if they wear the HMD 210L or 210R. Also, the HMDs 210L and 210R receive 3D virtual images from an image processing system described later. Therefore, the players 2000 and 3000 view a 3D virtual picture displayed on the display screen of the HMD 210L or 210R and superimposed over the real space transmitted through the optical system (not shown in FIG. 1) of the HMD 210L or 210R.

Figure 2:
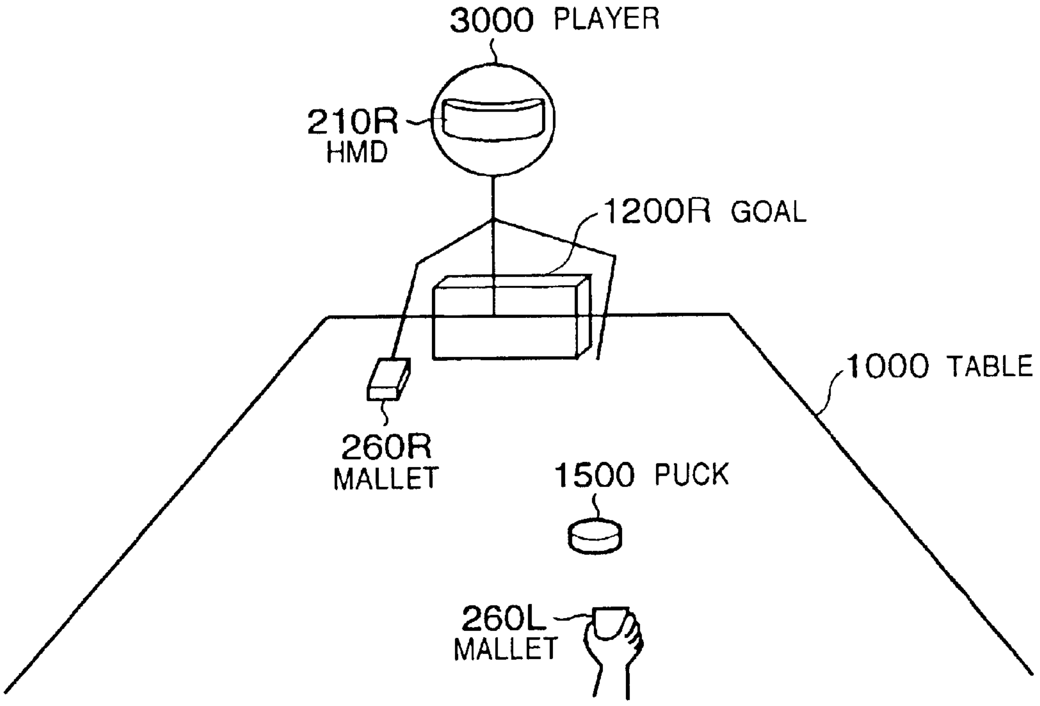
FIG. 2 is a drawing showing a picture as viewed by left player 2000 through his/her own HMD 210L.

FIG. 2 is a drawing showing a picture as viewed by the left player 2000 through his/her own HMD 210L. The two players compete to shoot a puck 1500 represented by a virtual picture. The player 2000 uses the real mallet 260L held in his/her hand to hit the puck. The goal 1200R is visible in front of the opposition player 3000. The image processing system (not shown in FIG. 2) generates a three-dimensional CG and displays it on the HMD 210L so that the goal 1200R will be visible near the opponent.

The opposition player 3000 will also see a virtual goal (not shown) near the player 2000 through the HMD 210R. The puck 1500 is also generated by the image processing system (not shown) and displayed on each HMD <HMD with a Magnetic Sensor>

FIG. 3 shows the configuration of the HMD 210. This HMD 210 is the see-through type. It is, for example the HMD body disclosed by Japanese published unexamined application H7-333551 with a magnetic sensor 220 mounted via a support rod 221. Reference numeral 211 denotes an LCD panel. The light (the picture presented to the observer) from the LCD panel 211 enters an optical member 212, reflects off a totally reflective surface 214, reflects off the totally reflective surface of a concave mirror 213, and reaches the observer's eyes passing through the totally reflective surface 214.

The magnetic sensor 220 measures the position/attitude of the observer's viewpoint. Since the magnetic sensor is vulnerable to magnetic noise, it is separated from the LCD panel 211, which is a noise source, by the support rod 221.

Incidentally, the configuration in which a magnetic sensor 220 is mounted on an HMD 210 as shown in FIG. 3 is not limited to optical see-through type HMDs. It may also be applied to video see-through type HMDs of for the purpose of detecting the position/attitude of the video camera's viewpoint.

In FIG. 1, the HMDs 210L and 210R are secured to the head of the players 2000 and 3000, respectively, with a band (not shown). The players have the magnetic sensor 220 (220L or 220R) shown in FIGS. 1 and 3 as well as a CCD camera 240 (240L or 240R), imaging means, fastened to their head. The field of view of the CCD camera 240 is set to the area in front of the player. In the case of air hockey games, since the players look at the top surface of the table 1000, the cameras 240 also capture the surface of the table 1000. An AC magnetic field generator 250 is fixed at any such place that the magnetic sensors 220 fall within its range. The magnetic sensors 220 sense the changes in the AC magnetic field generated by the AC magnetic field generator 250.

According to the changes in the AC magnetic field sensed by the magnetic sensors 220, a position/attitude measuring section 5000 (not shown in FIG. 1) measures the positions/attitudes of the magnetic sensors 220 in the sensor coordinate system 8010 defined around the AC magnetic field generator 250. Position/attitude transformation sections 5060 (5060L and 5060R) (not shown in FIG. 1) transform the positions/attitudes of the magnetic sensors 220 in the sensor coordinate system 8010 into the positions/attitudes of the players' viewpoints in the global coordinate system 8000, based on the calibration data (acquired by a calibration technique described later) stored in calibration data storage sections 5080 (5080L and 5080R) (not shown in FIG. 1). Incidentally, as the magnetic sensors 220, AC magnetic field generator 250, and position/attitude measuring sections 5000, this embodiment employs position/attitude measuring system Fastrak from Polhemus Inc. Besides, the position/attitude transformation sections 5060 and calibration data storage sections 5080 are implemented, for example, using an Onyx2 computer system from SGI.

When the player lowers his/her gaze obliquely to look at the surface of the table 1000, the changes in the position/attitude of the player's viewpoint are detected by the magnetic sensor 220. The surface of the table 1000, virtual puck 1500 described above, real mallets 260 (260L and 260 R), and virtual goals 1200 (1200L and 1200R) are shown through the HMD 210, based on the detected changes in the position/attitude. In this way, the changes in the position/attitude of the player's viewpoint is always detected by the magnetic sensor 220 and the player can see the picture and real space, based on the detected position/attitude.

The position and attitude of an object B in a coordinate system A will be represented herein by a 4×4 matrix $M_{BA}$. In other words, it is the matrix for coordinate transformation from the coordinate system A into the coordinate system B defined by the object B and defines a transformation $P_B=M_{BA}P_A$ for changing coordinates $P_A=(X_A, Y_A, Z_A, 1)^T$ in the coordinate system A into coordinates $P_B=(X_B, Y_B, Z_B, 1)^T$ in the coordinate system B. To put it another way, the position/attitude $M_{VW}$ of the viewpoint 1901 of the player 2000 in the global coordinate system 8000 is the coordinate transformation matrix ($P_V=M_{VW}P_W$) for changing coordinates $P_W=(X_W, Y_W, Z_W, 1)^T$ in the global coordinate system 8000 into coordinates $P_V=(X_V, Y_V, Z_V, 1)^T$ in the coordinate system of the player's viewpoint.

The transformation matrix M that represents the position/attitude of the object is given by the product of a rotation matrix $R_X$ around the X axis, rotation matrix $R_Y$ around the Y axis, rotation matrix $R_Z$ around the Z axis, and translation matrix T (all are 4×4). The relationship $M=RT=R_Z R_X R_Y T$ holds among these matrices, which are give by:

$$(x, y, z) = \begin{bmatrix} 1 & 0 & 0 & -x \\ 0 & 1 & 0 & -y \\ 0 & 0 & 1 & -z \\ 0 & 0 & 0 & 1 \end{bmatrix} \quad \text{[Equation 1]}$$

$$Rx(\theta x) = \begin{bmatrix} 1 & 0 & 0 & 0 \\ 0 & \cos\theta x & \sin\theta x & 0 \\ 0 & -\sin\theta x & \cos\theta x & 0 \\ 0 & 0 & 0 & 1 \end{bmatrix} \quad \text{[Equation 2]}$$

$$Ry(\theta y) = \begin{bmatrix} \cos\theta y & 0 & -\sin\theta y & 0 \\ 0 & 1 & 0 & 0 \\ \sin\theta y & 0 & \cos\theta y & 0 \\ 0 & 0 & 0 & 1 \end{bmatrix} \quad \text{[Equation 3]}$$

$$Rz(\theta z) = \begin{bmatrix} \cos\theta z & \sin\theta z & 0 & 0 \\ -\sin\theta z & \cos\theta z & 0 & 0 \\ 0 & 0 & 1 & 0 \\ 0 & 0 & 0 & 1 \end{bmatrix} \quad \text{[Equation 4]}$$

where x, y, z, θx, θy, and θz represent the position/attitude of the object. More particularly, x, y, z represent the position, θx the elevation angle, θy the direction angle, and θz the slope.

Figure 19:
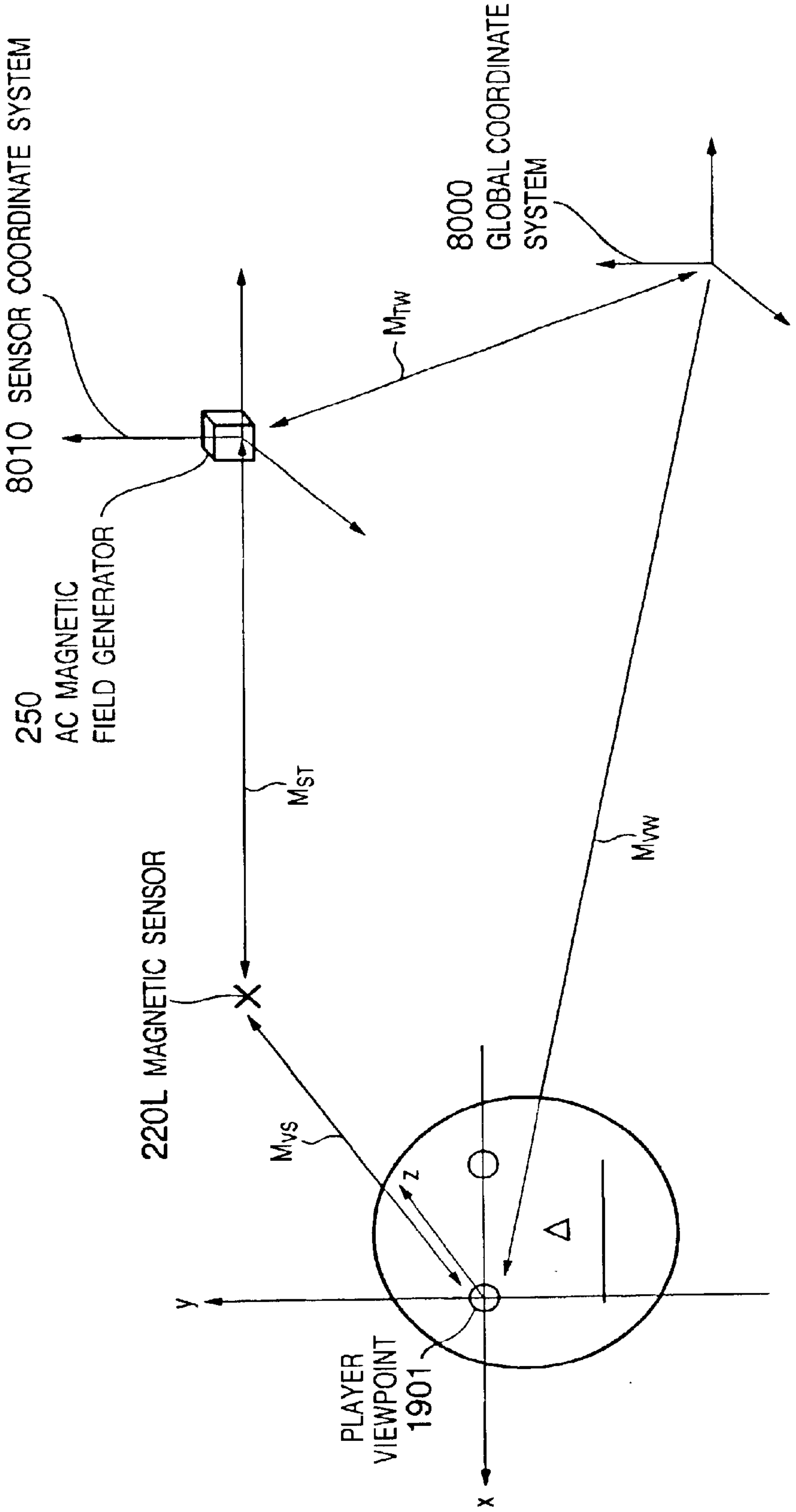
FIG. 19 is a drawing illustrating how the position/attitude transformation section 5060L determines the position/attitude $M_{VW}$ of the viewpoint 1901 of the player 2000 in a global coordinate system 8000.

The following describes with reference to FIG. 19 how the position/attitude transformation section 5060L determines the position/attitude $M_{VW}$ of the viewpoint 1901 of the player 2000 in the global coordinate system 8000.

In FIG. 19, the position/attitude of the magnetic field generator 250 in the global coordinate system 8000 (equivalent to the position/attitude of the sensor coordinate system 8010 in the global coordinate system 8000) is denoted by $M_{TW}$, position/attitude of the magnetic sensor 220L in the sensor coordinate system 8010 is denoted by $M_{ST}$, and relative position/attitude of the viewpoint 1901 of the player 2000 as viewed from the magnetic sensor 220L is denoted by $M_{VS}$.

Then the position/attitude $M_{VW}$ of the viewpoint 1901 of the player 2000 in the global coordinate system 8000 is given by:

$$M_{VW}=M_{VS}\cdot M_{ST}\cdot M_{TW} \quad \text{(Equation A)}$$

Of these positions/attitudes, $M_{ST}$ is the input into the position/attitude transformation section 5060L, $M_{VW}$ is the output from the position/attitude transformation section 5060L, and $M_{VS}$ and $M_{TW}$ are the calibration data needed to convert $M_{ST}$ into $M_{VW}$. That is, the position/attitude transformation section 5060L calculates $M_{VW}$ according to Equation A using the input $M_{ST}$ from the position/attitude measuring section 5000 as well as $M_{VS}$ and $M_{TW}$ stored in the calibration data storage section 5080L described later and outputs it to the image generation section 5050L described later.

<Configuration of Equipment During Calibration>

Figure 20:
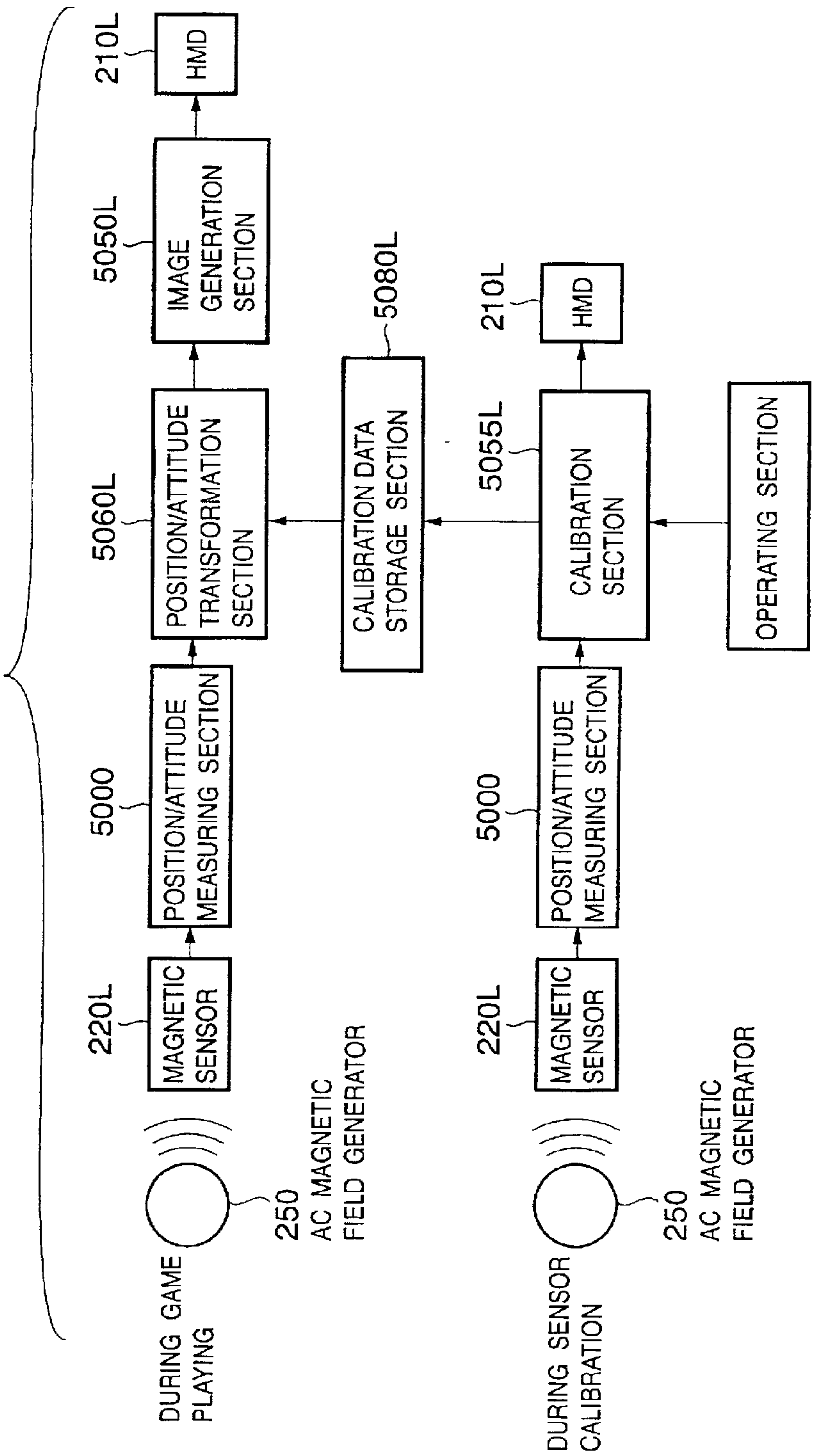
FIG. 20 is a drawing showing the equipment configuration used for the calibration of the game device according to the first embodiment of the present invention.

FIG. 20 shows the equipment configuration used for the calibration of the game device according to this embodiment. As shown in FIG. 20, the calibration uses almost the same equipment configuration as that for game playing. Specifically, the configuration includes the AC magnetic field generator 250, magnetic sensor 220L, position/attitude measuring section 5000, and HMD 210L as is the case with the configuration for game playing, but it has a calibration section 5055L and operating section 5090 instead of the position/attitude transformation section 5060L and the image generation section 5050L.

Figure 4:
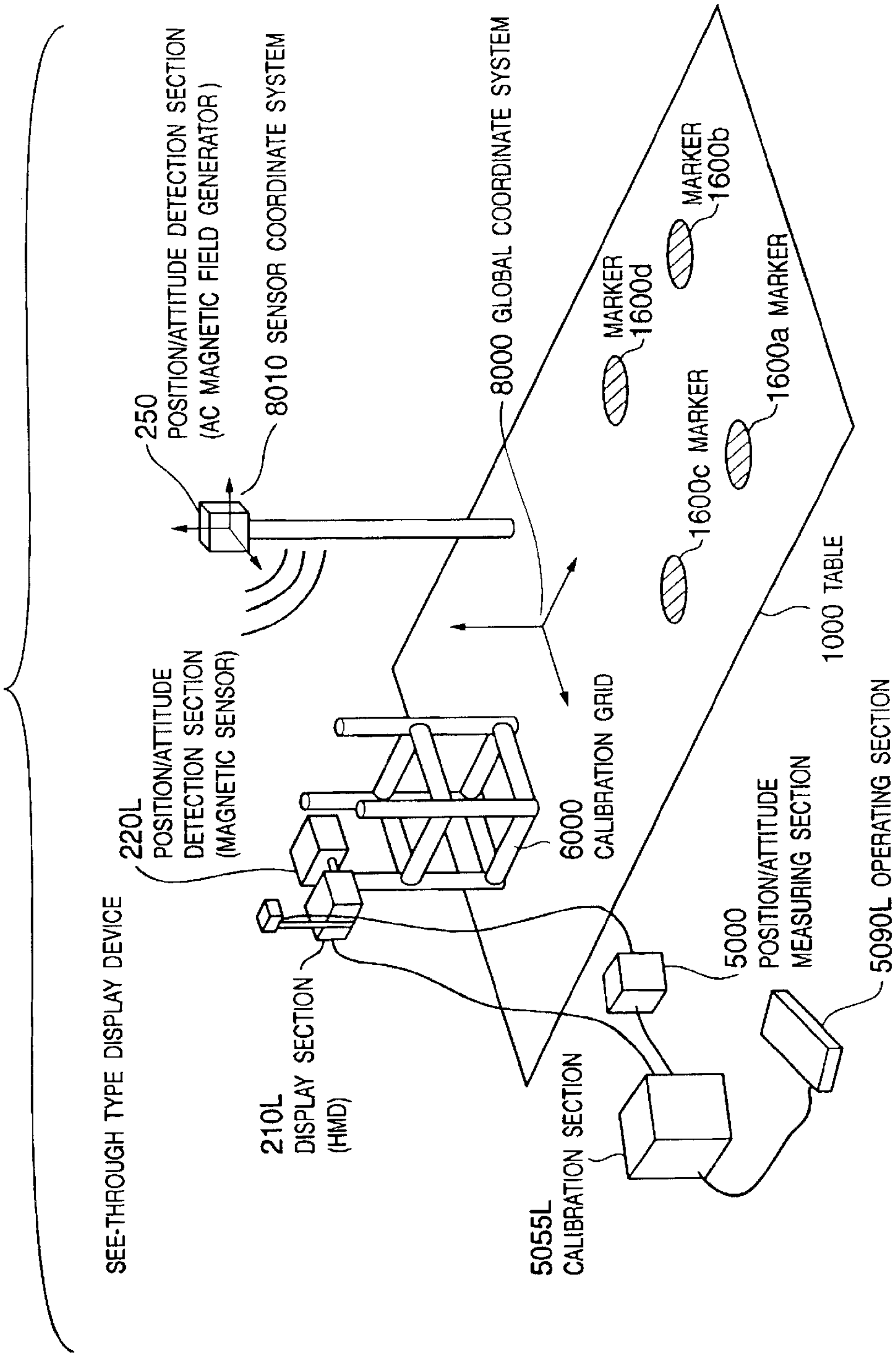
FIG. 4 is a drawing illustrating an outline of calibration setup.

FIG. 4 shows an outline of calibration setup. To perform calibration, the position/attitude $M_{VW}$ of the viewpoint 1901 of the player wearing the HMD 210L is moved to a predetermined position/attitude $M^0_{VW}$ (or the HMD 210L is moved by an operator (not shown) to such a position/attitude that the viewpoint 1901 of the player will be placed in the position/attitude $M^0_{VW}$ when the player puts on the HMD 210L) and the output $M^0_{ST}$ from the position/attitude measuring section 5000 is acquired at that time. Using the operating section 5090L, the player or unshown operator enters the information that the viewpoint 1901 is placed in the position/attitude $M^0_{VW}$. According to the input into the operating section 5090L, the calibration section 5055L receives the output $M^0_{ST}$ from the position/attitude measuring section 5000 at that time (i.e., at the time when the viewpoint 1901 is placed in the position/attitude $M^0_{VW}$), calculates the calibration data $M_{VS}$ or $M_{TW}$, whichever is unknown, based on the position/attitude $M^0_{VW}$ and position/attitude $M^0_{ST}$, and outputs the results to the calibration data storage section 5080L.

With this embodiment, it is assumed that the matrix $M_{TW}$ for coordinate transformation from the global coordinate system into the sensor coordinate system has been derived by some technique (e.g., a method described later) and that unknown calibration data is only $M_{VS}$. The calibration data storage section 5080L stores the calibration data $M_{VS}$ received from the calibration section 5055L and stores the $M_{TW}$ as known values. The transformation matrices $M_{VS}$ and $M_{TW}$ are referenced by the position/attitude transformation section 5060L during game playing.

A calibration grid 6000 can be placed at a fixed position in real space and has on itself an established position that will serve as a guide when moving the HMD 210L. The fixed position and established position have been designed such that when the calibration grid 6000 is placed at the fixed position and the HMD 210L is moved to the established position, the viewpoint 1901 of the player who wears the HMD 210L will be placed near the position/attitude $M^0_{VW}$. The calibration grid 6000 is built of plastic pipes to prevent interference when the magnetic sensor 220L receives the AC magnetic field outputted by the AC magnetic field generator 250 and helps the viewpoint 1901 remain in the position/attitude $M^0_{VW}$.

Markers 1600 (1600*a*, 1600*b*, . . . ) that have known values in the global coordinate system are placed on the table 1000. They are used in the processing by the calibration section 5055L (described later) to help the viewpoint 1901 remain in the position/attitude $M^0_{VW}$. Incidentally, this embodiment uses four markers 1600, but more markers may be used.

Figure 5:
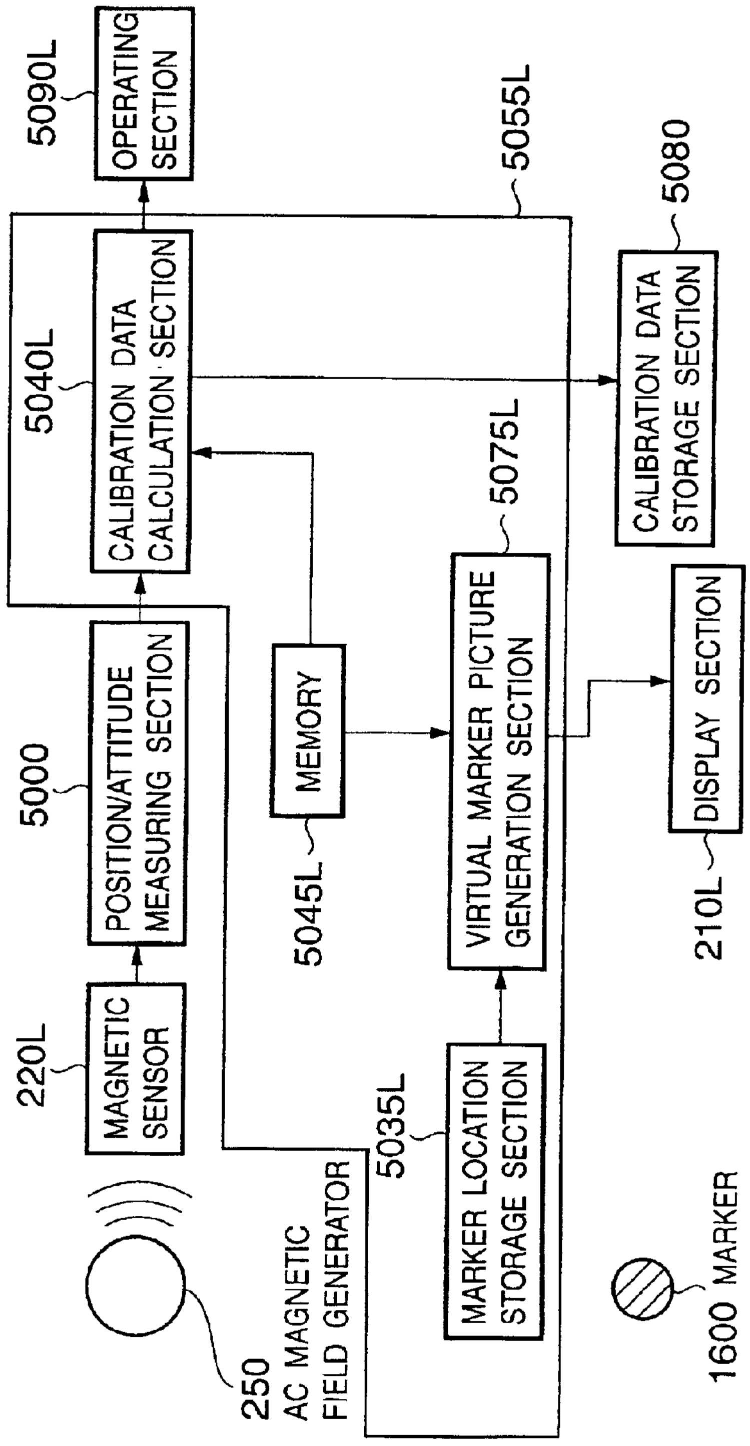
FIG. 5 is a drawing showing detailed configuration of the calibration section 5055L according to the first embodiment of the present invention.

Now the processing in the calibration section 5055L will be described in detail. FIG. 5 shows detailed configuration of the calibration section 5055L according to this embodiment. The calibration section 5055L is implemented, for example, using an Onyx2 computer system.

As shown in FIG. 5, the calibration section 5055L is composed of a memory 5045L, virtual marker picture generation section 5075L, marker location storage section 5035L, and calibration data calculation section 5040L.

The marker location storage section 5035L stores the locations of the markers 1600 in the global coordinate system and outputs the marker locations to the virtual marker picture generation section 5075L.

The memory 5045L stores the predetermined position/attitude $M^0_{VW}$ of the viewpoint 1901.

Based on the marker locations stored in the marker location storage section 5035L and the position/attitude $M^0_{VW}$ of the viewpoint 1901 stored in the memory 5045L, the virtual marker picture generation section 5075L calculates the location of each marker on the display screen where the marker will be seen by the player if the viewpoint 1901 is in the position/attitude $M^0_{VW}$, generates a virtual picture representing an X mark at that location, and makes it displayed on the display section 210L.

The display section 210L displays the virtual pictures of the markers generated by the virtual marker picture generation section 5075L while transmitting the markers 1600 in real space optically through itself. If the viewpoint 1901 is located in the position/attitude $M^0_{VW}$, the marker images in real space and the virtual pictures of the markers as viewed by the player should match.

The operating section 5090L detects that the viewpoint 1901 is placed in the position/attitude $M^0_{VW}$, based on the information entered by the player or unshown operator as described above, and sends an instruction to calculate calibration data to the calibration data calculation section 5040L. By rotation and translation of HMD 210L (and thus the viewpoint 1901), the player superimposes the virtual pictures of the markers displayed in the display section 210L and the marker images in the real space optically transmitted through the display section 210L, and when they are overlaid sufficiently, he/she enters input through the operating section 5090L, for example, by pressing a specific key.

According to the instructions sent from the operating section 5090L, the calibration data calculation section 5040L receives the output $M^0_{ST}$ from the position/attitude measuring section 5000 at the time when the instructions are entered (i.e., at the time when the viewpoint 1901 is placed in the position/attitude $M^0_{VW}$) as well as the position/attitude $M^0_{VW}$ stored in the memory 5045L and $M_{TW}$ stored in the calibration data storage section 5080L.

From Equation A, it follows that the following relationship exists among the data processed in the calibration data calculation section 5040L:

$$M^0_{VW}=M_{VS}\cdot M^0_{ST}\cdot M_{TW} \quad \text{(Equation B)}$$

Now rearranging Equation B, $$M_{VS}=M^0_{VW}\cdot M_{TW}^{-1}\cdot M^0_{ST}{}^{-1} \quad \text{(Equation C)}$$

The calibration data calculation section 5040L calculates the unknown calibration data $M_{VS}$ according to Equation C and outputs the results to the calibration data storage section 5080L.

Figure 6:
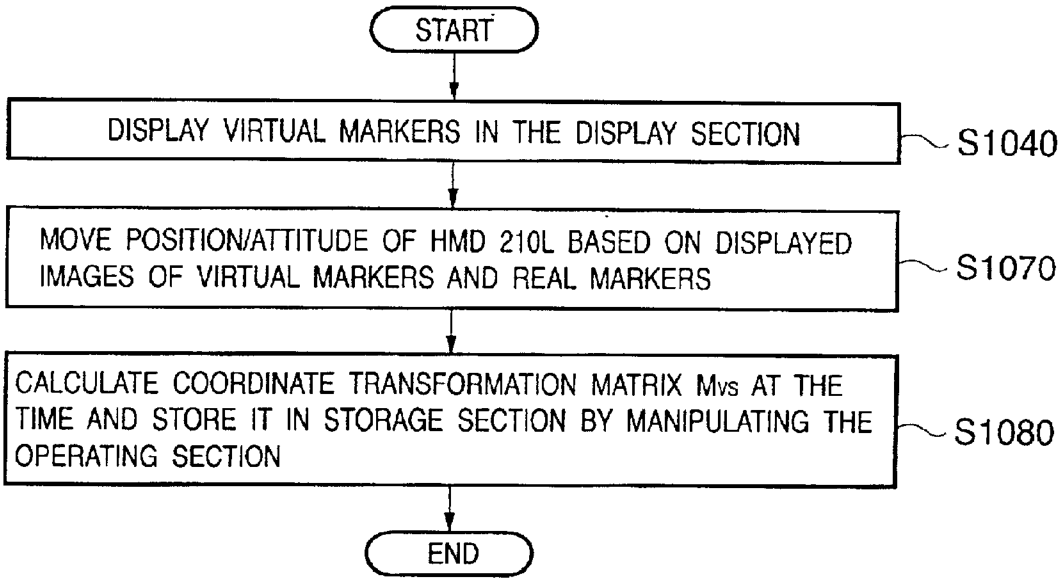
FIG. 6 is a process flowchart of the calibration apparatus according to the first embodiment of the present invention.

FIG. 6 shows a process flowchart of the calibration apparatus according to this embodiment. The program code according to this flowchart is stored in unshown memory such as a RAM or ROM in the apparatus of this embodiment, and read out and executed by a CPU (not shown).

Figure 7A:
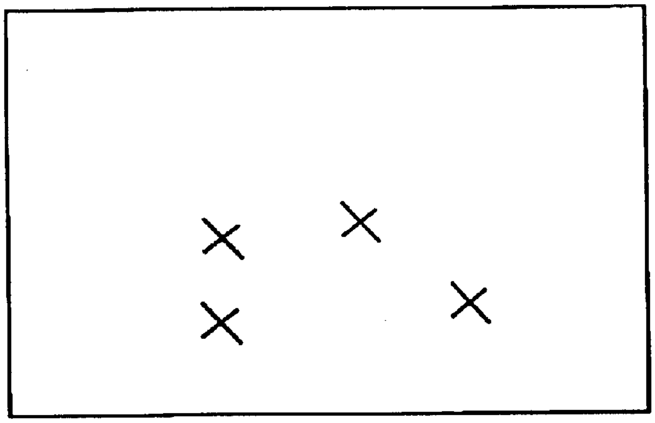
FIG. 7A is a drawing showing the image displayed on a display section 210L in Step S1040.
Figure 7B:
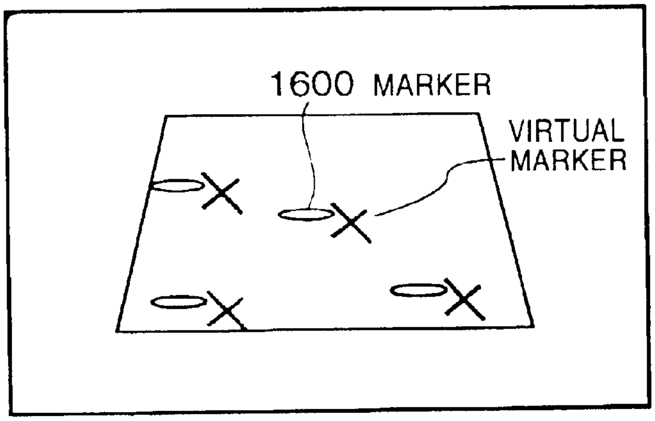
FIG. 7B is a drawing showing a picture optically transmitted through the display section 210L and viewed by a player.

In Step S1040, the virtual marker picture generation section 5075L generates virtual pictures in the manner described above, and makes it displayed in the display section 210L. The image displayed in the display section 210L in Step S1040 is shown in FIG. 7A. Each X mark in the figure represents the virtual picture of each marker. The markers 1600 placed in real space is viewed by the player optically through the display section 210L. The image viewed by the player in the display section 210L is shown in FIG. 7B.

Figure 7C:
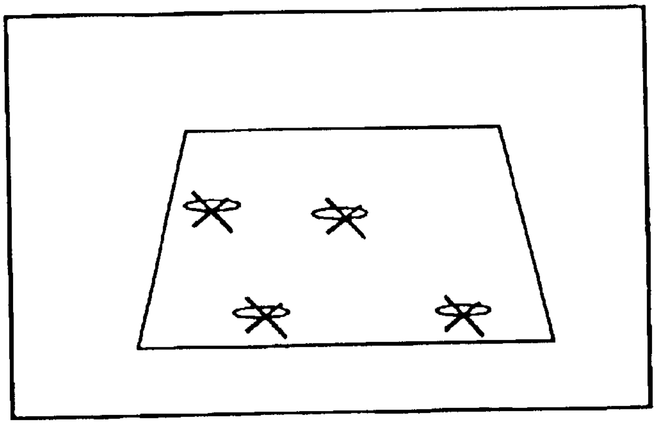
FIG. 7C is a drawing showing how the positions of a virtual marker picture and a real marker picture are superimposed exactly by parallel translation or rotation of HMD 210L (i.e., viewpoint 1901) in Step S1070.

In Step S1070, the virtual pictures of the markers and the marker images in real space are overlaid exactly by rotation or translation of HMD 210L (and thus the viewpoint 1901). (The state shown in FIG. 7C.)

When they are overlaid exactly, the operating section 5090L is manipulated in Step S1080.

In Step S1090, the calibration data calculation section 5040L calculates the coordinate transformation matrix $M_{VS}$ in the manner described above and outputs the results to the calibration data storage section 5080L.

<Derivation of the Position/Attitude $M_{TW}$ of the Sensor Coordinate System 8010 in the Global Coordinate System>

The following describes how to find the position/attitude $M_{TW}$ of the sensor coordinate system 8010 in the global coordinate system 8000.

The calibration grid 6000 is placed at a fixed position in real space and the magnetic sensor 220L is placed at a specified position (point of measurement) on the calibration grid 6000. There is more than one specified position. According to this embodiment, the output of the magnetic sensor 220L is measured at three points on the calibration grid 6000. The results of the measurements are entered in to the calibration section 5055L.

The calibration section 5055L calculates the position/attitude $M_{TW}$ of the sensor coordinate system 8010 in the global coordinate system 8000, based on the three measurements taken with the magnetic sensor 220L, and stores the results in the calibration data storage section 5080.

The following describes in detail how the calibration section 5055L finds the position/attitude $M_{TW}$.

Figure 18:
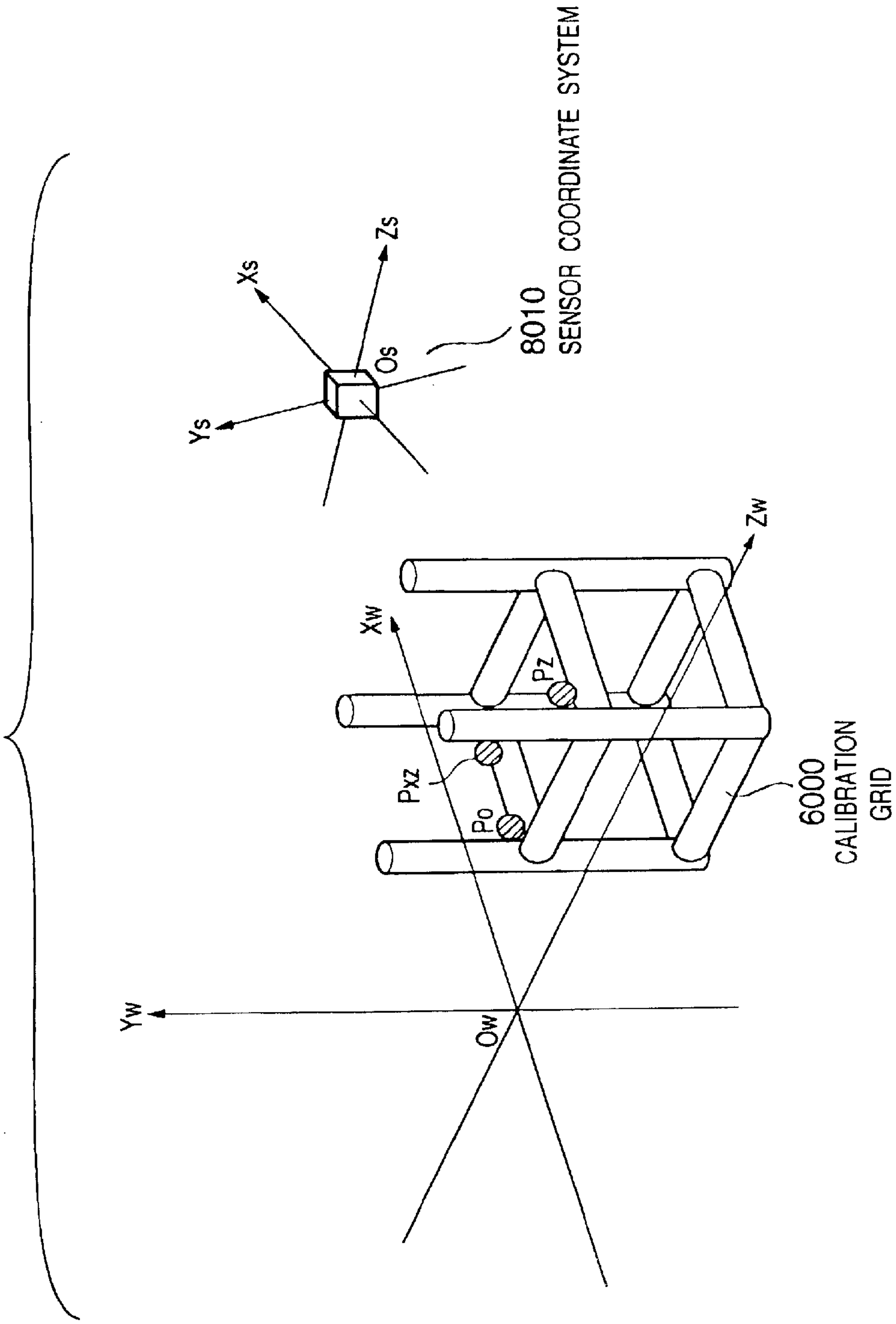
FIG. 18 is a conceptual diagram illustrating how a magnetic sensor measures its position/attitude.

FIG. 18 is a conceptual diagram illustrating how the magnetic sensor measures its position/attitude. Let $O_W$ denote the origin of the global coordinate system; $X_W$, $Y_W$, and $Z_W$—the x, y, and z axes of the global coordinate system, respectively; $O_S$—the origin of the sensor coordinate system (expressed as coordinates in the global coordinate system); $X_S$, $Y_S$, and $Z_S$—the x, y, and z axes of the sensor coordinate system (expressed as unit direction vectors in the global coordinate system); $P_O$, $P_Z$, $P_{ZX}$—the three points of measurement described above, respectively (expressed as coordinates in the global coordinate system); $V_O$, $V_Z$, $V_{ZX}$—the three points of measurement described above, respectively (expressed as coordinates in the sensor coordinate system). The three points described above must satisfy the following conditions. In other words, the fixed position for the calibration grid 6000 and the three points of measurement on the grid must be set such that the following conditions will be satisfied.

The position of $P_O$ in the global coordinate system must be known.

$P_Z$ must be such that the vector ($P_Z$-$P_O$) is parallel to, and in the same direction as, $Z_W$.

$P_{ZX}$ must be such that the plane containing the three points $P_O$, $P_Z$, and $P_{ZX}$ is parallel to the z-x plane in the global coordinate system and that the x component of the vector ($P_{XZ}$−$P_O$) in the global coordinate system will be positive.

Based on these conditions, the position/attitude $M_{TW}$ of the sensor coordinate system 8010 is determined in the following order.

First, since the vector ($P_Z$−$P_O$) is parallel to, and in the same direction as, $Z_W$, the unit vector $Z_S$ in the z direction of the sensor coordinate system is determined according to the following equation:

$$Z_S=(v_Z-v_O)/|v_Z-v_O|$$

Next, since the vector ($P_{ZX}$−$P_O$) is located on the z-x plane of the global coordinate system and has a positive x component, the unit vector $Y_S$ in the y direction of the sensor coordinate system is determined according to the following equation:

$$Y_S=(Z_S\times(v_{ZX}-v_O))/|Z_S\times(v_{ZX}-v_O)$$

Next, using $Z_S$ and $Y_S$ above, the unit vector $X_S$ in the x direction of the sensor coordinate system is determined according to the following equation:

$$X_S=Y_S\times Z_S$$

From $Z_S$, $Y_S$, and $X_S$ thus obtained, the attitude of the sensor coordinate system in the global coordinate system can be determined as follows. Let $X_S=(X_X, Y_X, Z_X)$, $Y_S=(X_Y, Y_Y, Z_Y)$, and $Z_S=(X_Z, Y_Z, Z_Z)$, and the attitude $R_{TW}$ of the sensor coordinate system in the global coordinate system is given by:

$$R_{TW}=\begin{bmatrix} X_x & X_y & X_z & 0 \\ Y_x & Y_y & Y_z & 0 \\ Z_x & Z_y & Z_z & 0 \\ 0 & 0 & 0 & 1 \end{bmatrix} \quad \text{[Equation 5]}$$

Next, the position of the sensor coordinate system in the global coordinate system (i.e., the position $O_s$ of the origin of the sensor coordinate system in the global coordinate system) is determined. The following method uses $P_O$, but $P_Z$ or $P_{ZX}$ may be used if their global coordinates are known:

$$O_S=P_O-R_{TW}^{-1}v_O$$

Hence, the translation matrix $T_{TW}$ that represents the position of the sensor coordinate system in the global coordinate system can be determined according to Equation 1.

Consequently, the position/attitude $M_{TW}$ of the sensor coordinate system in the global coordinate system can be derived using the following equation.

$$M_{TW}=R_{TW}T_{TW}$$

Based on the signals from the magnetic sensor 220L that takes measurements at multiple points of measurement, the position/attitude $M_{TW}$ of the sensor coordinate system in the global coordinate system can be determined by the above method.

Incidentally, the position/attitude $M_{TW}$ of the sensor coordinate system in the global coordinate system may be determined by trial and error using measurements taken with a measuring tape, protractor, etc. Also, needless to say, the position/attitude of the AC magnetic field generator may be determined using any available measuring means.

<3D Image Generation/Presentation System>

Figure 8:
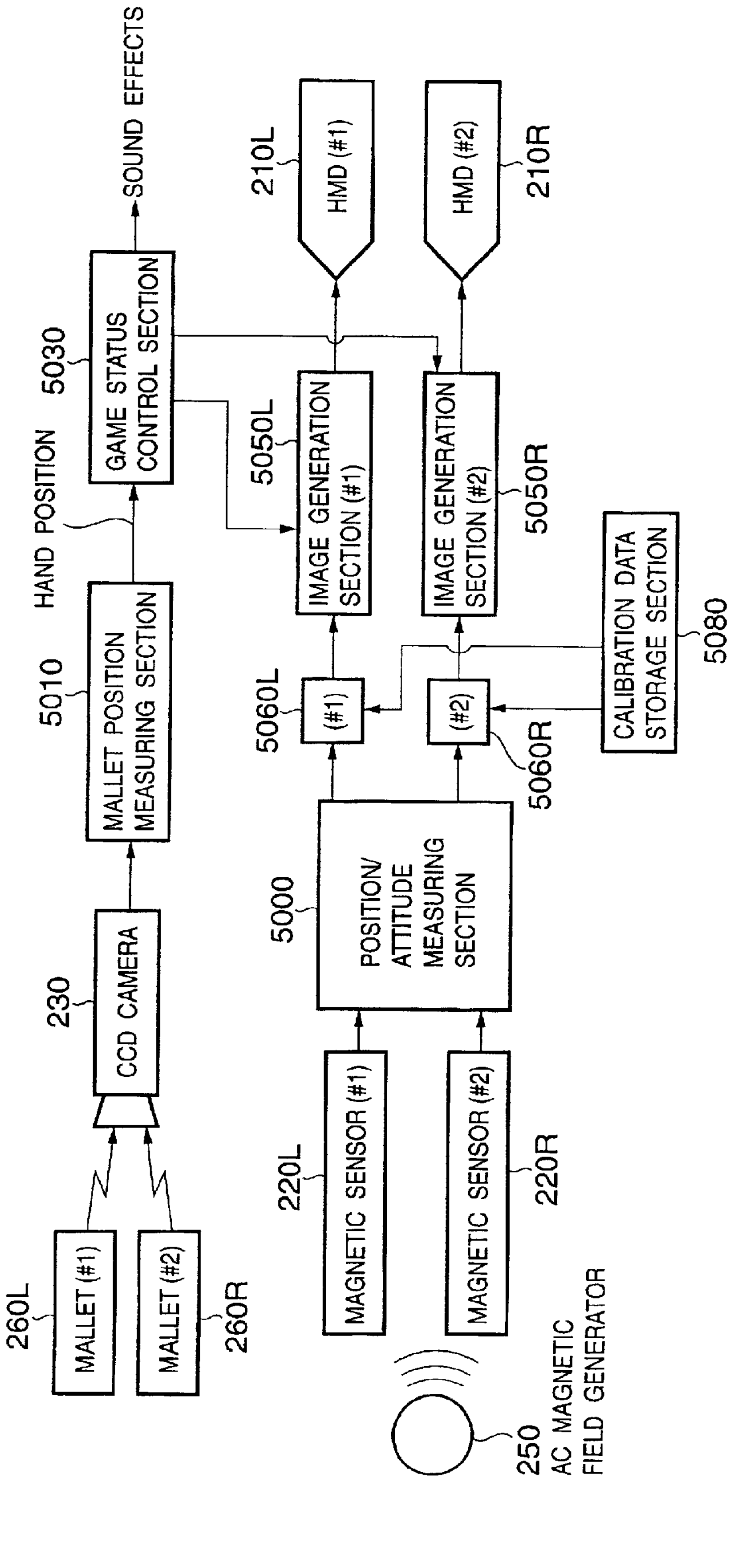
FIG. 8 is a drawing showing the configuration of a 3D image generation/presentation system that utilizes the calibration data obtained through calibration on the game device of FIG. 1.

FIG. 8 is a drawing showing the configuration of a 3D image generation/presentation system that utilizes the calibration data obtained through the above-mentioned calibration on the game device of FIG. 1.

The image generation/presentation system outputs respective 3D virtual pictures (puck 1500 and goals 1200 in FIG. 2) to the HMD 210L of the player 2000 and HMD 210R of the player 3000. The 3D virtual pictures for the players 2000 and 3000 are generated by the image generation sections 5050L and 5050R, respectively. This embodiment uses an Onyx2 computer system from a US company SGI for each of the image generation sections 5050L and 5050R.

The image generation section 5050L (5050R) receives puck position information and the like generated by a game status control section 5030 and the position/attitude of the viewpoint of the player 2000 (3000) output from the position/attitude transformation section 5060L (5060R) and generates images to be displayed on the HMD 210L (210R). The game status control section 5030 is implemented using the ONYX2 computer system.

A CCD camera 230 (also shown in FIG. 1) fixed above the center of the table 1000 covers the entire surface of the table 1000 by its field of view. The mallet information including the mallet position information acquired by the camera 230 is entered into a mallet position measuring section 5010, which similarly is implemented using the ONYX2 computer system from SGI. The mallet position measuring section 5010 detects the positions of the mallets, i.e., the positions of the hands, of the two players. The information about the hand positions are entered into the game status control section 5030. In short, everything about the status and progress of the game is determined by the positions of the mallets.

<Mallet Position Measurement>

Figure 9:
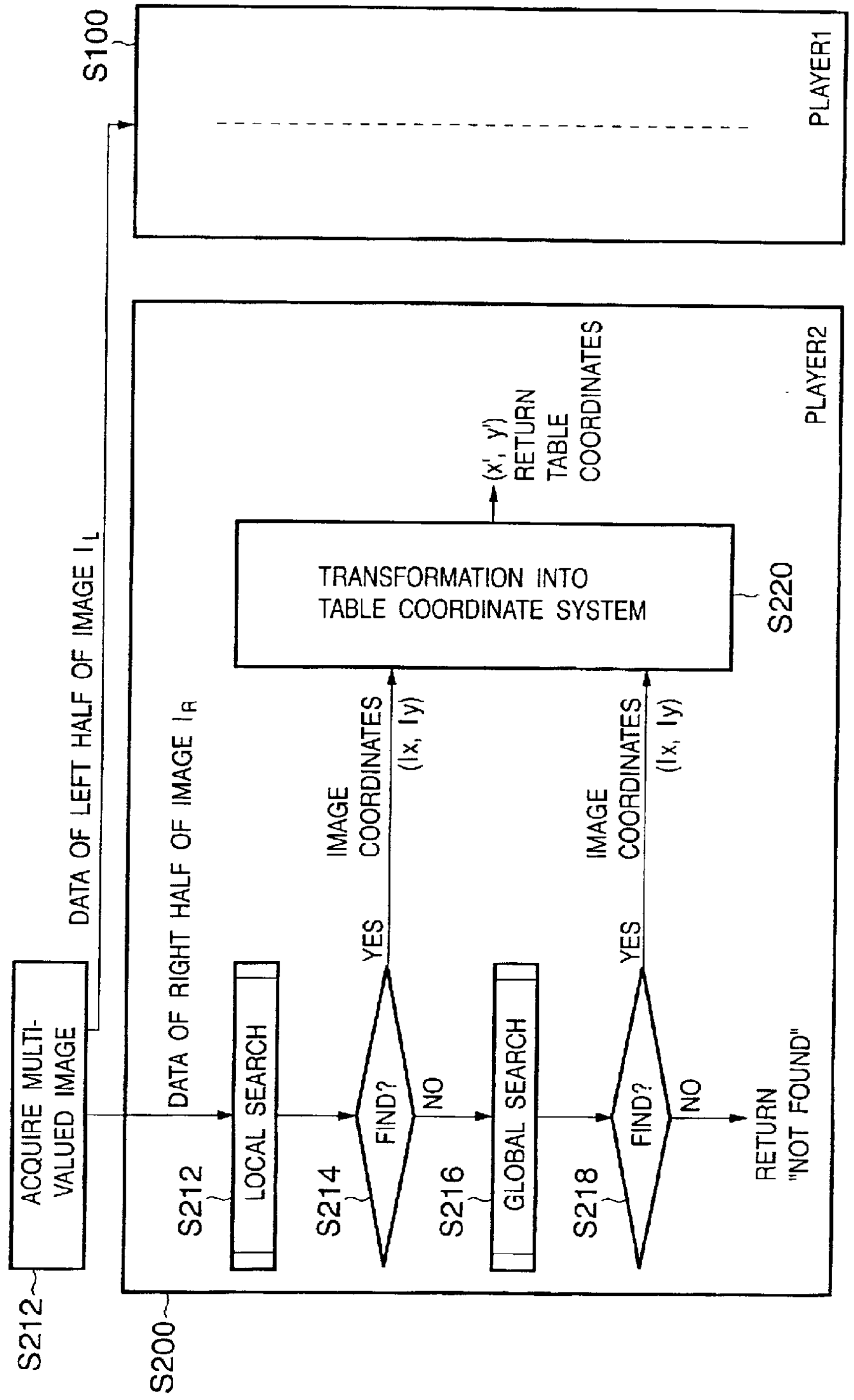
FIG. 9 is a flowchart showing the control procedures for measurement of mallet position.
Figure 10:
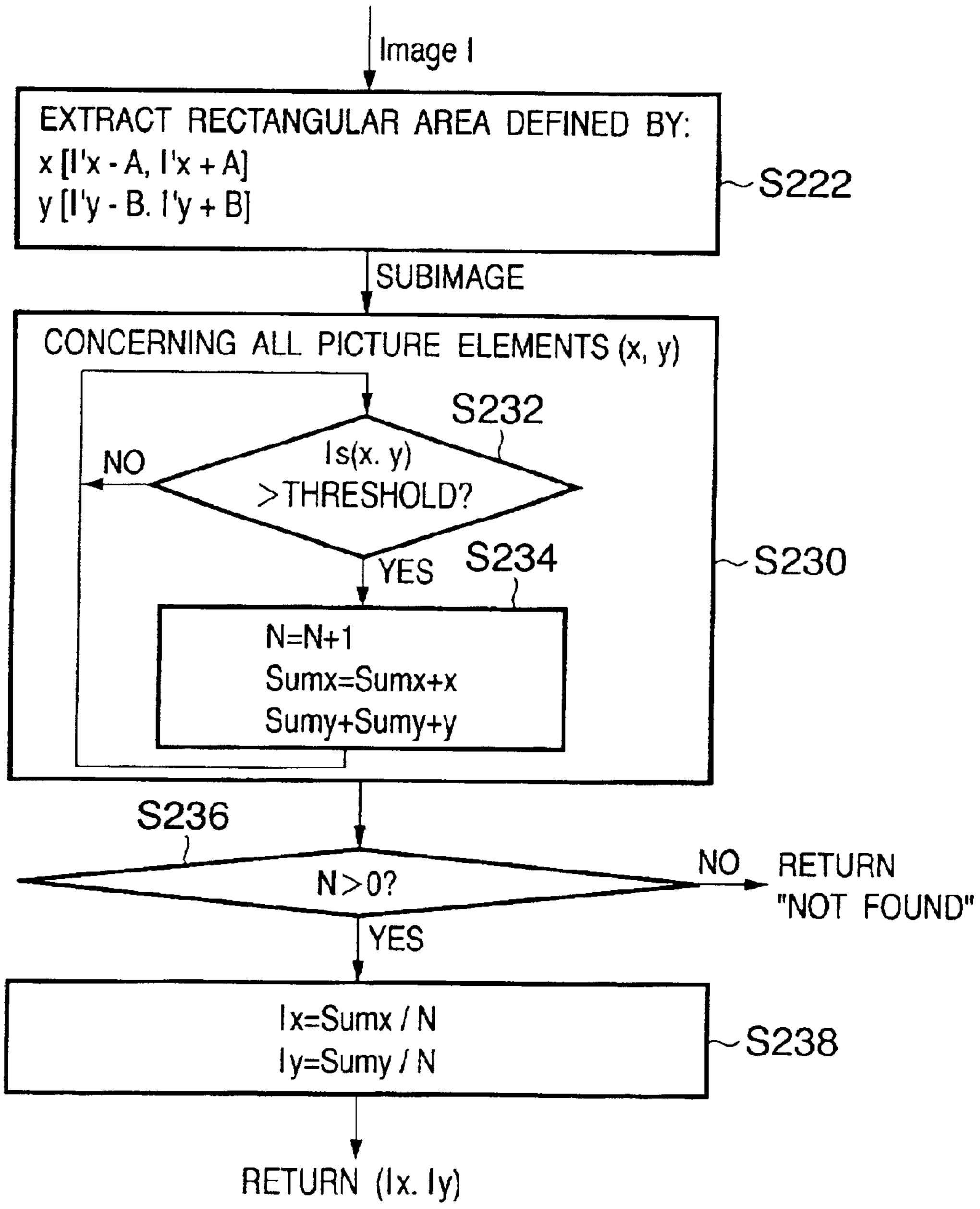
FIG. 10 is a flowchart showing the control procedures for measurement of mallet position.
Figure 11:
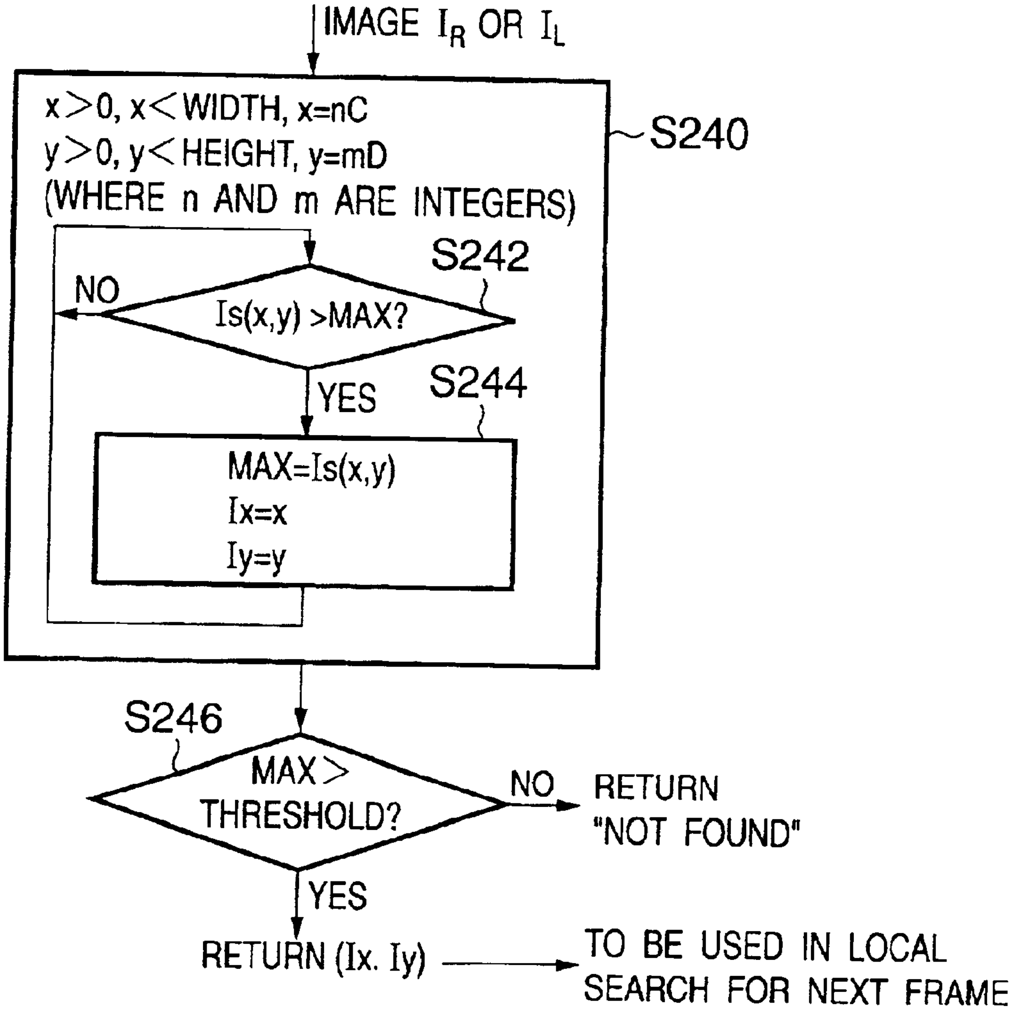
FIG. 11 is a flowchart showing the control procedures for measurement of mallet position.

FIG. 9 to FIG. 11 are flowcharts showing the control procedures for measurement of mallet position.

Figure 12:
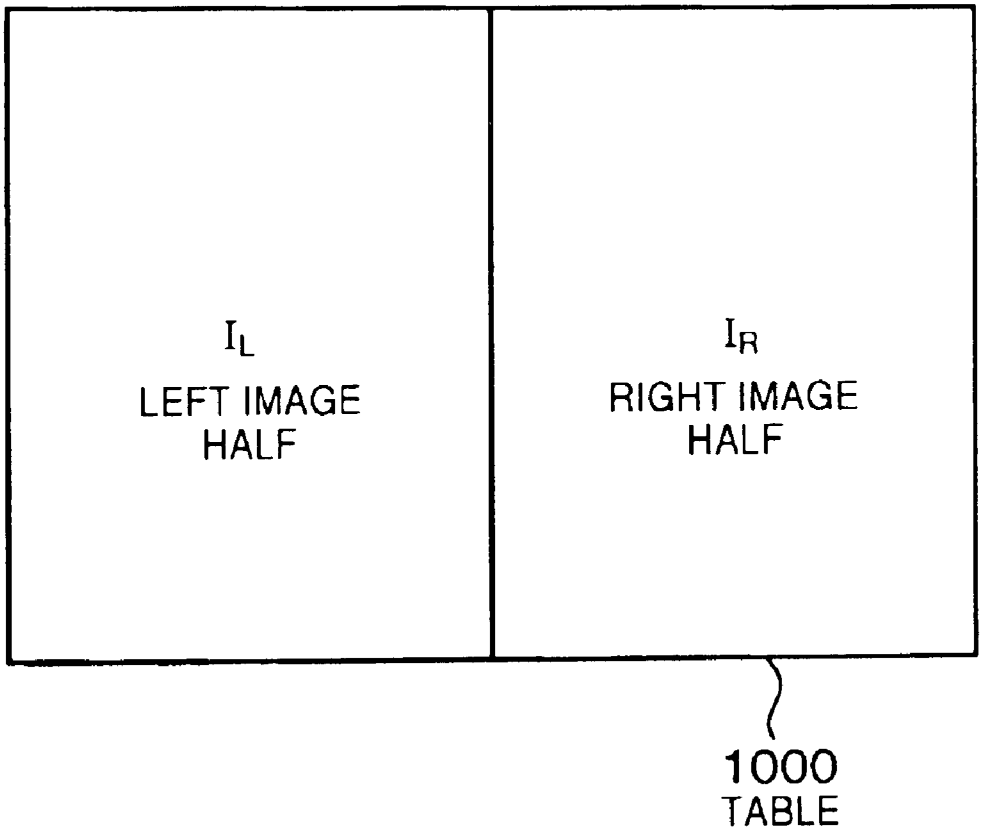
FIG. 12 is a drawing illustrating the split halves of the image obtained by a CCD camera 230 located in a fixed position.

In the air hockey game, the player will never put his/her mallet in the other player's area. Therefore, to search for the mallet 260L (260 R) of the left player 2000 (right player 3000), the search process can be concentrated on the image data IL in the left field (image data IR) as shown in FIG. 11. The image captured by the CCD camera 230 at a fixed position can be easily split in two as shown in FIG. 12.

In the flowchart of FIG. 9, the mallet 260L of player #1 (player 2000) is searched for in Step S100 and the mallet 260 R of player #2 (3000) is searched for in Step S200. Therefore, only the search operation (Step S200) for the mallet of the right player will be described for convenience.

In Step S210, the above-mentioned image (multi-valued image) captured by the imaging section 230 is acquired. In Step S212, subroutine "Local Search" is run on the image data IR about the right half of the captured image. Details are shown in FIG. 10. If the coordinates (x, y) of the mallet position in an image coordinate system is found in Step S212, the flow goes from Step S214 to Step S220, where the coordinates (x, y) of the mallet position in the image coordinate system is transformed into the coordinate position (x', y') in the coordinate system (see FIG. 14) of the table 1000 according to Equation 6.

$$\begin{bmatrix} hx' \\ hy' \\ h \end{bmatrix} = M_T \begin{bmatrix} x \\ y \\ 1 \end{bmatrix} \quad \text{[Equation 6]}$$

where $M_T$ is a known 3×3 transformation matrix for the calibration of the image coordinate system and table coordinate system. The coordinate position (x', y') obtained in Step S220 is sent to the game status control section 5030.

If the mallet cannot be found in the local area, "Global Search" is run in Step S216. If the mallet is found by the "Global Search," the coordinate position is transformed into the position in table coordinate system in Step S220. The coordinate position retrieved by the local or global search is used for a local search for the mallet in the next process.

FIG. 10. shows the process of a local search for the mallet (i.e., details of Step S212). Although the process shows a search in the right field for convenience, it can similarly be applied to search in the left field.

In Step S220, the rectangular area made of (2A+1)×(2B+1) picture elements and defined by the following equations is extracted.

$$x=[I'x-A,\ I'x+A]$$

$$y=[I'y-A,\ I'y+B]$$

where I'x and I'y are any coordinate values in the search area IR, and A and B are constants that determine the size of the search area. Such a search area will look like the one shown in FIG. 13.

Step S230 is the process of extracting the picture elements whose character evaluation value IS (x, y) satisfies specific conditions from all the picture elements (x, y) in the rectangular area defined in Step S220. In this process, it is preferable to use a methods that extracts the picture elements which are similar to the intensity value of the infrared rays emitted from the infrared emitter of the mallet.

In other words, in Step S232, any picture element whose similarity IS exceeds a designated threshold is searched for. If such picture elements are found, the cumulative value of their generation rate is stored on a counter N. Also, the x coordinates and y coordinates of these picture elements are accumulated in registers SUMx and SUMy. Thus, $$N=N+1$$

$$\mathrm{SUM}x=\mathrm{SUM}x+x$$

$$\mathrm{SUM}y=\mathrm{SUM}y+y$$

Figure 13:
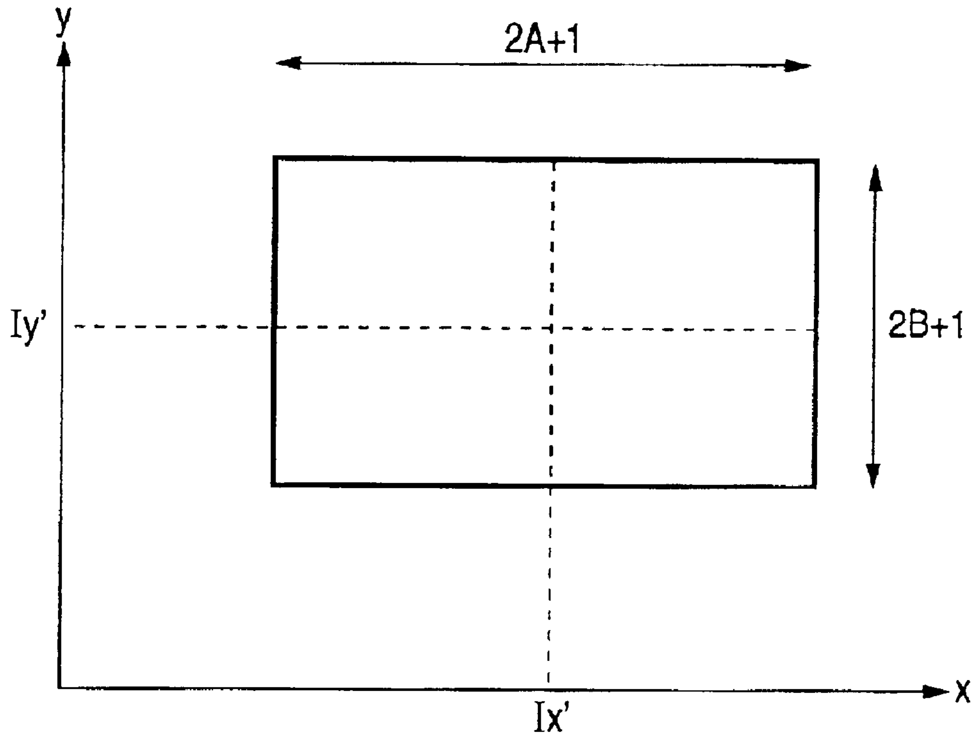
FIG. 13 is a drawing showing a search area.

When Step S230 is completed, the number N of all the picture elements in the area of FIG. 13 which are similar to the pattern of the infrared rays emitted from the mallet as well as cumulative values SUMx and SUMy of the coordinates are obtained. If N=0, the result "Not Found" is output in Step S236. If N>0, something that looked like a mallet was found and the position (Ix, Iy) of the mallet is calculated according to the following equations in Step S238:

$$Ix=\mathrm{SUMx}/n$$

$$Iy=\mathrm{SUMy}/n$$

The mallet position (Ix, Iy) is transformed into coordinates in the table coordinate system.

FIG. 11 shows detailed procedures for the global search performed in Step S216. In Step S240 shown in FIG. 11, among the picture elements contained in the image IR in the right field, the maximum value of the character evaluation values IS of the picture elements that satisfy the following conditions is stored in a register Max.

$$\{(x, y) | x>0,\ x<\text{Width},\ x=nC,$$

$$y>0,\ y<\text{Height},\ y=mD$$

Figure 16:
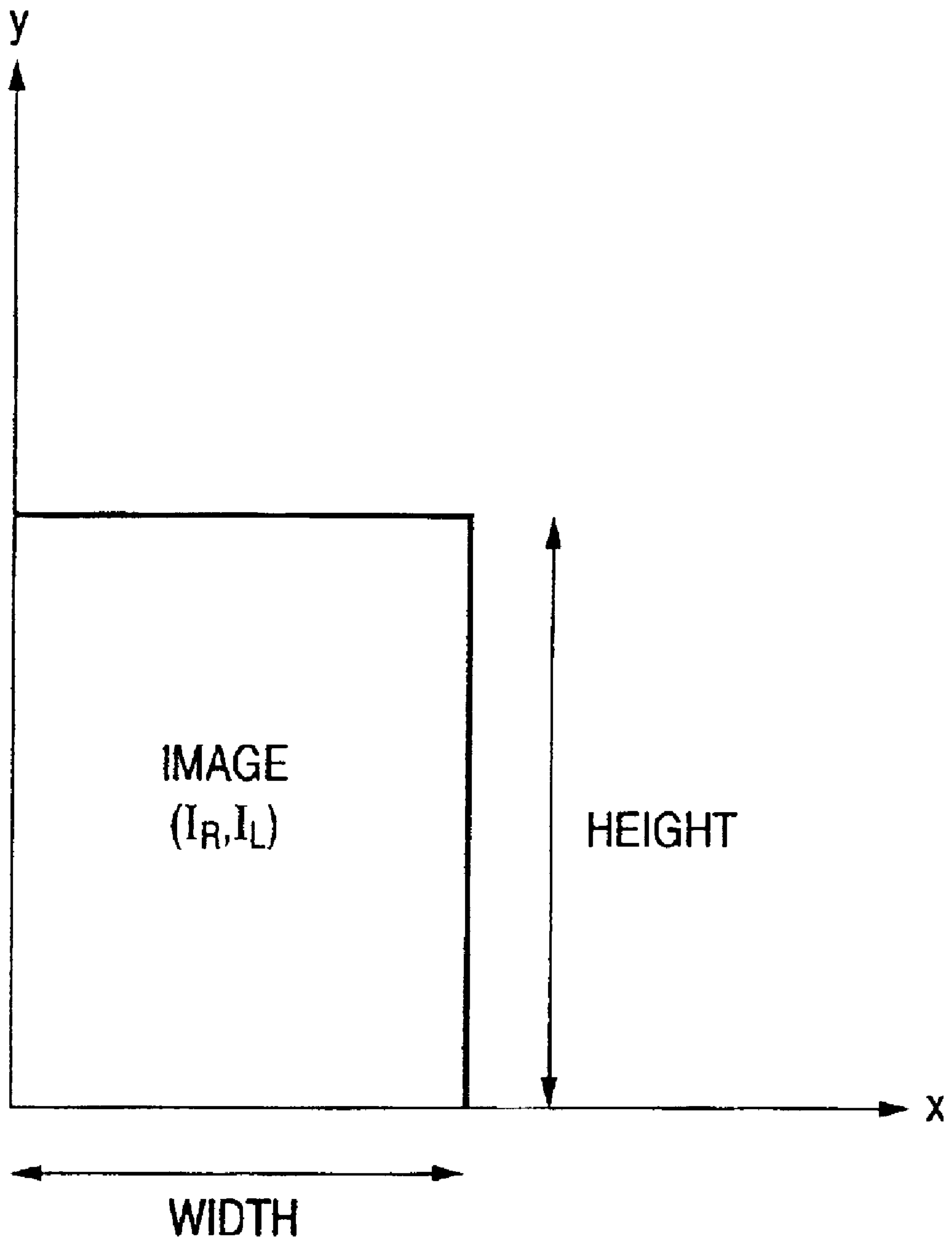
FIG. 16 is a drawing illustrating the definitions of width and height.

(where n and m are integers)} where C and D are constants that determine the roughness of the search. The definitions of width and height are shown in FIG. 16. In short, it is judged in Step S242 whether the character rating IS exceeds the threshold stored in the register Max. If any appropriate picture element is found, the character rating is set as a new threshold in Step S244 as follows:

$$Max=IS(x, y)$$

$$Ix=x$$

$$Iy=y$$

In Step S246, the coordinates (Ix, Iy) of the most probable picture element found in the global search is passed to Step S220.

In this way, the mallet is found in the image, its coordinates are transformed into the coordinates in the table coordinate system, and the results are passed to the game status control section 5030.

<Game Status Control>

Figure 14:
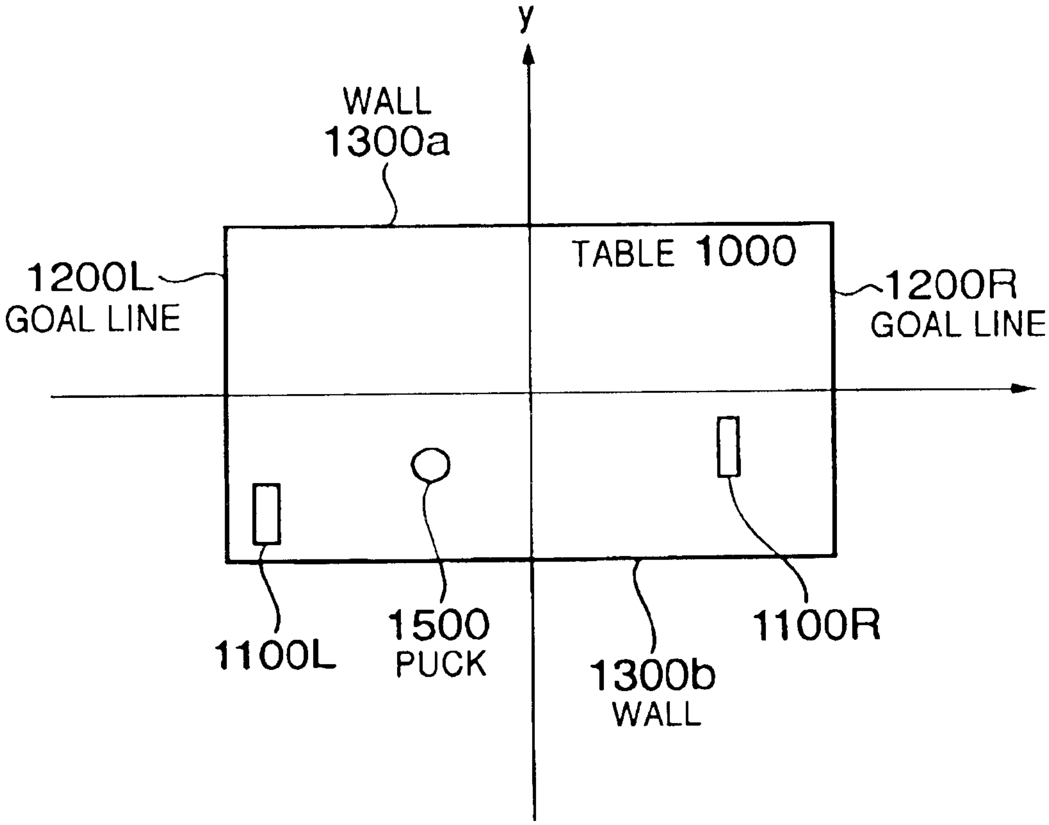
FIG. 14 is a drawing showing the game field for air hockey games according to the first embodiment of the present invention.

FIG. 14 shows the game field for air hockey games according to this embodiment. This field is defined in the two-dimensional plane on the table 1000 and has x and y axes. It also has two—left and right—virtual goal lines 1200L and 1200R as well as virtual walls 1300*a* and 1300*b* installed on top and bottom in FIG. 14. The virtual goal lines 1200L and 1200R and virtual walls 1300*a* and 1300*b* have known coordinates and are not moved. In this field, the virtual image of the puck 1500 moves in accordance with the movement of the mallets 260R and 260L.

The puck 1500 has coordinate information $P_P$ and velocity information $V_P$ of the current position, the left mallet 260L has coordinate information $P_{SL}$ and velocity information $V_{SL}$ of the current position, and the right mallet 260R has coordinate information $P_{SR}$ and velocity information $V_{SR}$ of the current position.

Figure 15:
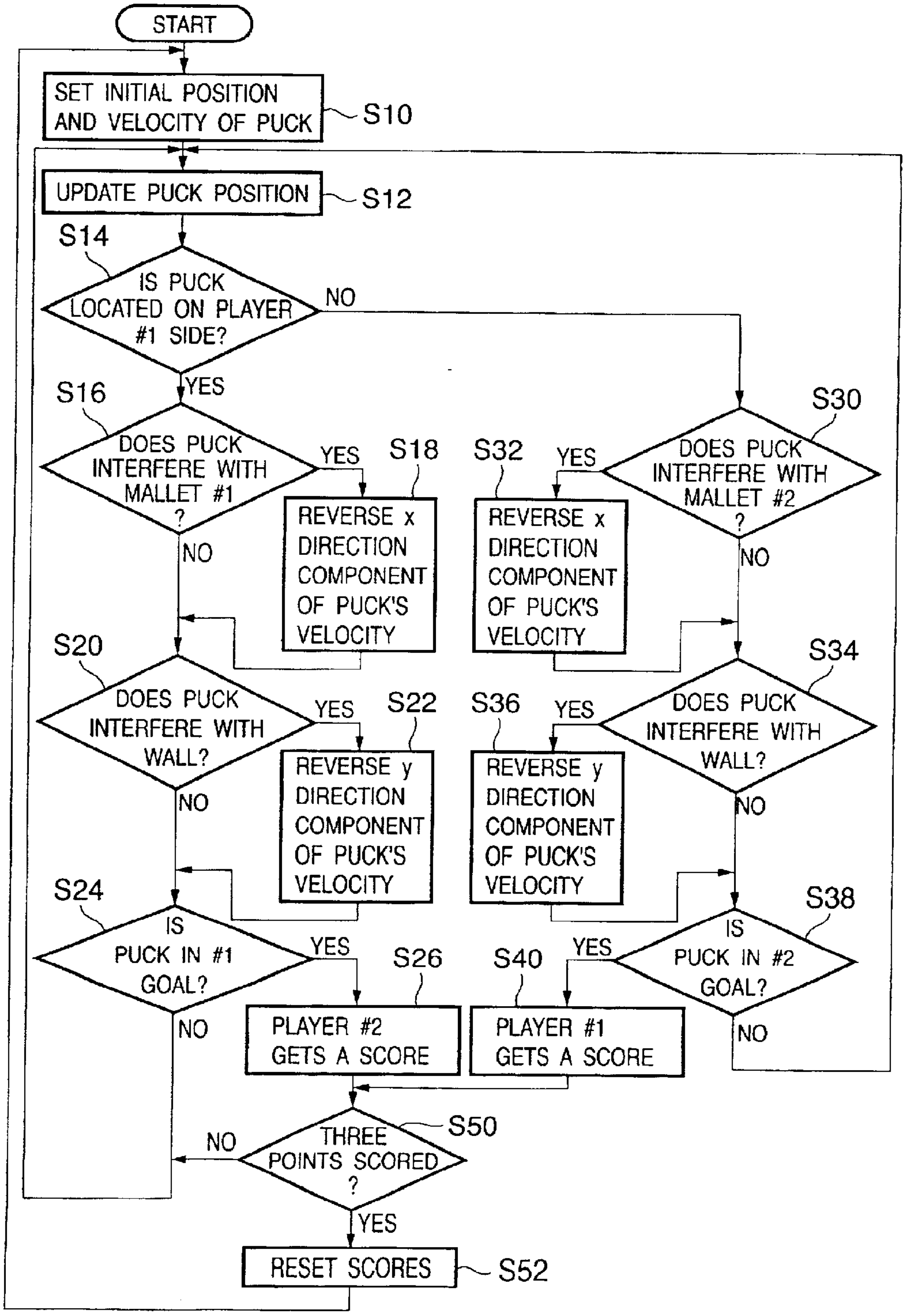
FIG. 15 is a flowchart illustrating the processing procedures carried out in a game status control section 5030.

FIG. 15 is a flowchart illustrating the processing procedures carried out in the game status control section 5030. In Step S10, the initial position $P_{P0}$ and initial velocity $V_{P0}$ of the puck 1500 are set.

The puck 1500 performs uniform motion at velocity $V_P$. If it hits a mallet or wall, a perfectly elastic collision takes place. That is, the speed remains unchanged and the velocity direction is reversed.

The game status control section 5030 obtains velocity information $V_S$ from the position information $P_S$ of each mallet calculated by the mallet position measuring section 5010.

Step S12 is repeated at time intervals of Δt until the outcome of the game is decided (either player scores three points first in Step S50).

Then the position of the puck 1500 is updated to $$P_p=P_{p0}+v_{p0}\cdot\Delta t$$

The position of the puck 1500 after the initial position and velocity setting are generally given by $$P_p=P_p+v_p\cdot\Delta t$$

In Step S14, it is checked whether the updated puck position $P_P$ is in the field of player #1 (left player). The case in which the puck 1500 is located on the side of the left player will be described below.

In Step S16, it is checked whether the puck is currently located such that it interferes with the mallet 260L of the left player. If the puck 1500 interferes with the mallet 260L, it means that the left player 2000 manipulated the mallet in such a way that the mallet 260L collided with the puck. Thus, to reverse the motion of the puck 1500, the sign of the x direction component of the puck's (1500) velocity $V_P$ is changed in Step S18. Then the flow advances to Step S20.

Incidentally, instead of simply changing the sign of the x direction component of the velocity $V_P$, the puck may be made to advance in the opposite direction with the manipulation velocity of the mallet added as follows:

$$P_p=-P_{px}+v_{SLX}$$

On the other hand, if the puck currently does not interfere with the mallet 260L of the left player ("NO" in Step S16), the flow advances directly to Step S20.

In Step S20, it is checked whether the puck is currently located such that it collides with the virtual wall 1300*a* or 1300*b*. If the answer in Step S20 is YES, the y direction component of the puck's velocity $V_P$ is reversed in Step S22.

In Step S24, it is checked whether the puck is currently located to the left of the goal line of the left player. If YES, the opposition player, i.e., the right (#2) player gets a score in Step S26. In Step S50, it is checked whether any of the players scored three points or more first. If YES, the game finishes.

If it turns out in Step S14 that the puck position $P_P$ is in the field of the right player (player #2), Step S30 and subsequent steps are performed. Steps S30 to S40 are practically the same as Steps S16 to S26.

So the progress of the game is managed in the manner described above. The progress of the game, which is represented by the positions of the puck and mallet, is entered in the image generation sections 5050 (5050L and 5050R).

Figure 17:
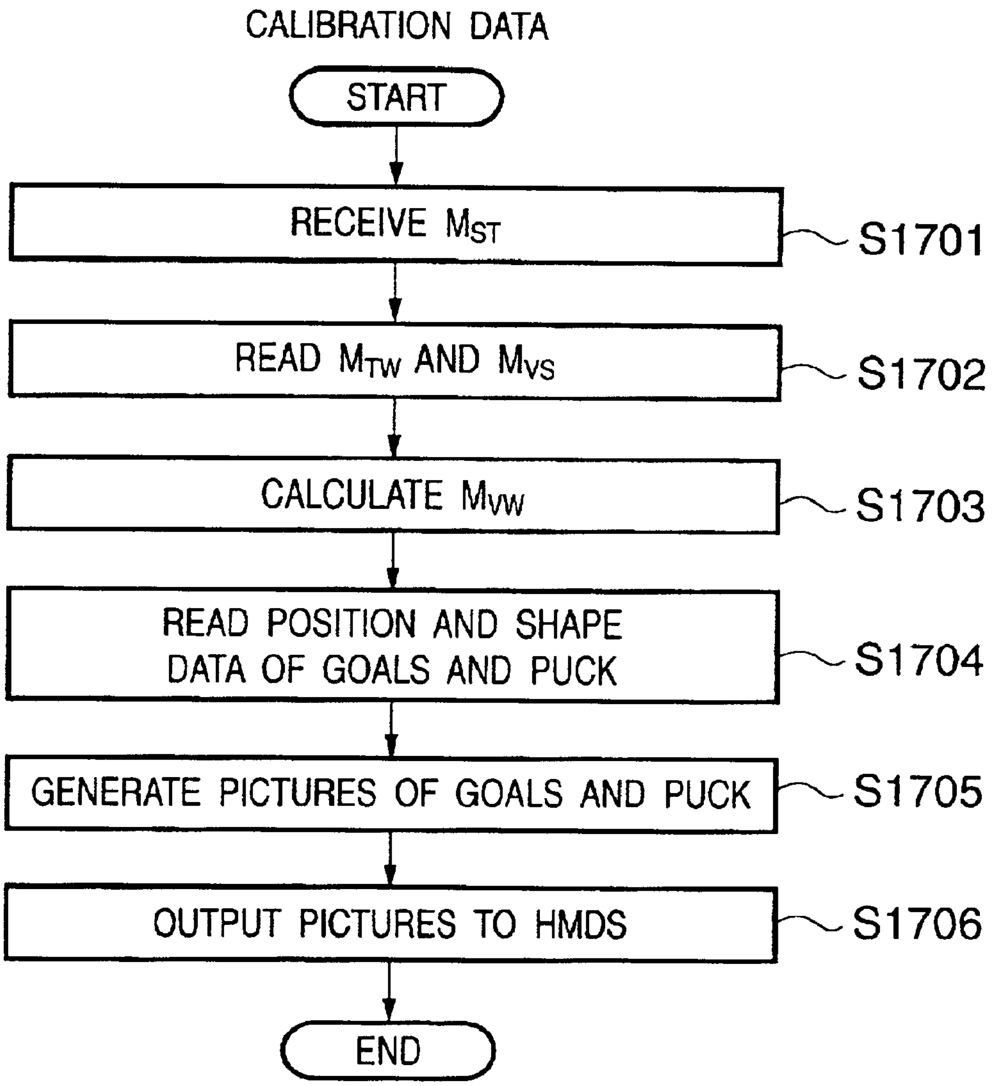
FIG. 17 is a flowchart of processes carried out in position/attitude transformation sections 5060 (5060L, 5060R) and image generation sections 5050 (5050L, 5050R)

FIG. 17 shows a flowchart of processes carried out in the position/attitude transformation sections 5060 (5060L, 5060R) and image generation sections 5050 (5050L, 5050R). The processes in this flowchart are common to the left and right players.

The position/attitude transformation section 5060L receives the position/attitude $M_{ST}$ of the magnetic sensor in the sensor coordinate system from the position/attitude measuring section 5000 in Step S1701. Then, in Step S1702, it reads the calibration data $M_{TW}$ and $M_{VS}$ from the calibration data storage section 5080. In Step S1703, it determines the position/attitude $M_{VW}$ of the player's viewpoint 1901 using Equation A.

The image generation sections 5050 read the position and shape data of the goals and puck from memory (not shown) in the game status control section 5030 in Step S1704, generate pictures of the goals and puck based on the position/attitude $M_{VW}$ of the player's viewpoint 1901 in Step S1705, and output the generated pictures to the HMD 210L and HMD 210R of the respective players in Step S1706.

As described above, the calibration apparatus and method thereof according to this embodiment can calculate the positions/attitudes of the players' viewpoints even if the calibration data needed to convert the output values of the magnetic sensors into the players' viewpoints are unknown.

[Second Embodiment]

In the first embodiment, the relative positions/attitudes $M_{VS}$ of the players' viewpoints as viewed from the magnetic sensors are unknown. In other words, both the translation component $T_{VS}$ and rotation component $R_{VS}$ of the transformation matrix $M_{VS}$ are unknown.

Also, in the first embodiment, both the translation component $T_{TW}$ and rotation component $R_{TW}$ of the position/attitude $M_{TW}$ of the sensor coordinate system in the global coordinate system are known.

In relation to the second embodiment, the following describes how to calculate unknown calibration data, i.e., the rotation component $R_{VS}$ of $M_{VS}$ and translation component $T_{TW}$ of $M_{TW}$ when the translation component $T_{VS}$ of $M_{VS}$ and rotation component $R_{TW}$ of $M_{TW}$ are known in some way or other. This embodiment has the same equipment configuration as that of the first embodiment, and differs only in the processing inside the calibration data calculation section 5040L.

The translation component $T_{VS}$ of $M_{VS}$ (i.e., the relationship between the position of the magnetic sensor and position of the user's viewpoint) is measured directly, for example, with a rule. The rotation component $R_{TW}$ of $M_{TW}$ is calculated using, for example, the method of finding $R_{TW}$ described in relation to the first embodiment.

Alternatively, these values may be derived by trial and error as described in relation to $M_{TW}$ for the first embodiment, or any other measuring technique may be used.

It is assumed that the known parameters are stored in the calibration data storage sections 5080 as is the case with the first embodiment.

Separating Equation B into rotation and translation components, $$R^0_{VW}T^0_{VW}=R_{VS}T_{VS}\cdot M^0_{ST}\cdot R_{TW}T_{TW} \quad \text{(Equation D)}$$

Re-arranging Equation D, $$R_{VS}^{-1}R^0_{VW}T^0_{VW}T_{TW}^{-1}=T_{VS}M^0_{ST}R_{TW} \quad \text{(Equation E)}$$

Since all the terms on the right side have known values, if their product is calculated and replaced with a matrix M' and the matrix M' is decomposed into M'=R' T' (where R' is the rotation component and T' is the translation component), then Equation E is written as $$R_{VS}^{-1}R^0_{VW}T^0_{VW}T_{TW}^{-1}=R'T' \quad \text{(Equation F)}$$

Since the rotation component and translation component exist as identities in the right side member and left side member of Equation F, respectively, $R_{VS}$ is given by:

$$R_{VS}=R^0_{VW}R'^{-1}$$

Similarly, $T_{TW}$ is given by:

$$T_{TW}=T'^{-1}T^0_{VW}$$

Finally, the resulting calibration data $R_{VS}$ and $T_{TW}$ are output to the calibration data storage section 5080.

[Third Embodiment]

This embodiment concerns the method of calculating unknown calibration data, i.e., the position/attitude $M_{TW}$ of the sensor coordinate system in the global coordinate system when the relative positions/attitudes of the players' viewpoints $M_{VS}$ as viewed from the magnetic sensors are known in some way or other.

This embodiment has the same equipment configuration as that of the first embodiment, and differs only in the processing inside the calibration data calculation section 5040L. The unknown calibration data $M_{TW}$ is calculated by rearranging Equation B as follows, and is output to the calibration data storage section 5080L.

$$M_{TW}=M^0_{ST}{}^{-1}\cdot M_{VS}{}^{-1}M^0_{VW}$$

Alternatively, $M_{VS}$ may be derived by the method of the first embodiment; by trial and error based on values measured with a rule, protractor, etc.; or by any other measuring means.

[Fourth Embodiment]

Although the first to third embodiments relate to calibration of magnetic sensors which are position/attitude sensors for measuring the positions/attitudes of objects, the present invention can also be applied to calibration of attitude sensors that measure only the attitudes of objects. The fourth embodiment concerns the method of determining the calibration data needed to convert the output values of attitude sensors (i.e., the attitudes of the attitude sensors in the sensor coordinate system) into attitudes of the players' viewpoints in the global coordinate system for a game device that uses attitude sensors. This embodiment has the same equipment configuration as that of the first embodiment except that it comprises attitude sensors and an attitude measuring section.

Now let $R_{TW}$ denote the attitude of the sensor coordinate system in the global coordinate system, $R_{ST}$—the attitude of the attitude sensor (output values from attitude sensor) in the sensor coordinate system, and $R_{VS}$—the relative attitude of the player's viewpoint as viewed from the attitude sensor. Incidentally, although most attitude sensors do not have explicit devices for defining a sensor coordinate system, such as the AC magnetic field generator in the case of magnetic sensors, if it is assumed that the sensor attitude in the global coordinate system corresponds to $R_{TW}$ when sensor output is pointing to the origin (i.e., when $R_{ST}$=I is output), the coordinate transformation is given by a relation similar to those used in the first to third embodiments. Thus, the Equation A can be expressed as $$R_{VW}=R_{VS}\cdot R_{ST}\cdot R_{TW} \quad \text{(Equation G)}$$

where $R_{ST}$ is the input into the position/attitude transformation section 5060L, $R_{VW}$ is the output from the position/attitude transformation section 5060L, and $R_{VS}$ and $R_{TW}$ are the calibration data needed to convert $R_{ST}$ into $R_{VW}$. Thus, the position/attitude transformation section 5060L calculates $R_{VW}$ according to Equation G using the input $R_{ST}$ from the position/attitude measuring section 5000 as well as $R_{VS}$ and $R_{TW}$ stored in the calibration data storage section 5080L. The position/attitude transformation section 5060L further calculates the position/attitude $M_{VW}$ of the player's viewpoint in the global coordinate system, based on the calculated attitude $R_{VW}$ of the player's viewpoint in the global coordinate system and the position $T_{VW}$ of the player's viewpoint in the global coordinate system, and outputs the results to the image generation section 5050L. ($T_{VW}$ may be the values measured by a position sensor such as an ultrasonic sensor or optical sensor. Alternatively, predetermined fixed values may be used if the position of the viewpoint does not move or the amount of travel is negligible. Also, position information obtained by any other means may be used.)

This embodiment assumes that of the attitude $R_{TW}$ of the sensor coordinate system, only the rotation component $Ry_{TW}$ around the y axis (i.e., in the azimuth direction) is unknown and that the rotation component $Rx_{TW}$ around the x axis and rotation component $Rz_{TW}$ around the z axis are unit matrices (i.e., $R_{TW}=Ry_{TW}$). Since many attitude sensors can output values in a coordinate system in real space by measuring the direction of the earth gravitation except values in the azimuth direction (around the y axis, in the yaw direction), the y axes of the global coordinate system and sensor coordinate system coincide if the global coordinate system is defined as being parallel to the ground surface. Thus, $Rx_{TW}$ and $Rz_{TW}$ can be considered to be unit matrices.

This embodiment also assumes that, of the relative attitude $R_{VS}$ of the player's viewpoint as viewed from the sensor, the rotation component $Ry_{SV}$ around the y axis of its inverse matrix $R_{SV}$ (relative attitude of the attitude sensor as viewed from the player's viewpoint) is known in some way or other while the rotation component $Rx_{SV}$ around the x axis and rotation component $Rz_{SV}$ around the z axis are unknown. $Ry_{SV}$ may be derived by trial and error using values measured with a protractor, etc., or by any other measuring means.

The known data $Rx_{TW}$, $Rz_{TW}$, and $Ry_{SV}$ have been stored in the calibration data storage section 5080L.

Calibration is performed by moving the attitude $R_{VW}$ of the viewpoint 1901 of the player wearing the HMD 210L to a predetermined attitude $R^0_{VW}$ ($=Ry^0_{VW}$) and acquiring the sensor output $R^0_{ST}$ at that time. Using Equation G, the relationship among these data can be expressed as $$Ry^0_{VW}=(Rz_{SV}Rx_{SV}Ry_{SV})^{-1}R^0_{ST}Ry_{TW} \quad \text{(Equation H)}$$

Rearranging Equation H $$Rz_{SV}Rx_{SV}Ry_{SV}Ry^0_{VW}=Rz^0_{ST}Rx^0_{ST}Ry^0_{ST}Ry_{TW}$$

Since both left-side and right-side members are products of rotation components around the z, x, and y axes, an identity holds for the rotation component around each axis: the z, x, and y axes. The identities of the rotation components around the z and x axes are given as $$Rz_{SV}=Rz^0_{ST}$$

$$Rx_{SV}=Rx^0_{ST}$$

from which $Rz_{SV}$ and $Rx_{SV}$ can be determined.

On the other hand, the identity of the rotation component around the y axis can be determined from the following equation.

$$Ry_{SV}Ry^0_{VW}=Ry^0_{ST}Ry_{TW}$$

Thus, $Ry_{TW}$ is given as $$Ry_{TW}=Ry_{SV}Ry^0_{VW}Ry^0_{ST}{}^{-1}$$

The calibration data calculation section 5040L according to this embodiment calculates the calibration data $Rz_{SV}$, $Rx_{SV}$, and $Ry_{TW}$ as described above, further calculates $R_{VS}$ ($=(Rz_{SV}Rx_{SV}Ry_{SV})^{-}1$) and $R_{TW}$ ($=Ry_{TW}$), and then outputs the results to the calibration data storage section 5080L.

The memory 5045L according to this embodiment retains the predetermined position $T^0_{VW}$ of the viewpoint needed for the virtual marker picture generation section 5075L to generate virtual pictures of markers in addition to the predetermined attitude $R^0_{VW}$ of the viewpoint needed to calculate the calibration data described above.

<Variation 1>

Although the embodiments described above use an optical HMD, the present invention is not limited to optical HMDs, but it can also be applied to video see-through type HMDs.

In that case, the measuring object, which is the player's viewpoint 1901 according to the embodiments described above, will be an imaging apparatus (e.g., a video camera) installed in the video see-through type HMD. The predetermined position/attitude $M^0_{VW}$ will be given as the position/attitude of the viewpoint of the imaging apparatus and the transformation matrix $M_{VS}$ will be given as the transformation matrix that represents the position/attitude of the imaging apparatus as viewed from the magnetic sensor 220L.

According to this variation, the virtual marker picture generation section 5075L superimposes a virtual picture of markers over the picture (marker image) of real space captured by the imaging apparatus, based on the predetermined position/attitude $M^0_{VW}$, and displays the resulting picture in the display section. The markers 1600 must be such that they can be distinguished from the table 1000 in the marker image. The operator manipulates the position/attitude of the imaging section to overlay the real and virtual pictures of the markers. In video see-through mode, the display section does not always need to use the HMD 210L of the game device during calibration unlike in optical see-through mode, but a CRT display or other display units may be used.

<Variation 2>

Even if a game device uses an optical HMD, calibration may be performed in video see-through mode as with Variation 1 if the HMD 210L is equipped with an imaging apparatus whose relative position/attitude as viewed from the player's viewpoint is known.

According to this variation, the virtual marker picture generation section 5075L superimposes a virtual picture of markers over the picture (marker image) of real space captured by the imaging apparatus, according to the position/attitude of the imaging apparatus in the global coordinate system, determined by a predetermined position/attitude $M^0_{VW}$ of the player's viewpoint and the position/attitude of the imaging apparatus as viewed from the player's viewpoint, and displays the resulting picture in the display section. If the HMD 210L is used as the display section, it is desirable to make display surface light-tight by adjusting its transmittance.

<Variation 3>

Although the above embodiments use the markers 1600—which are point information—as a guide in alignment, any geometry information may be used as long as it provide visual clues when moving the position/attitude of a viewpoint to a predetermined position/attitude $M^0_{VW}$. For example, the user may capture the geometry of a real object such as a desk from the environment and draw its wire-frame model according to a predetermined position/attitude $M^0_{VW}$. In this case, it is possible to lead the viewpoint to the position/attitude $M^0_{VW}$ by moving the viewpoint so as to match the image of the real desk and the superimposed picture of the wire-frame model. The viewpoint can also be led to the position/attitude $M^0_{VW}$ as follows: if the virtual object (e.g., the virtual puck in the first embodiment) displayed after calibration is drawn according to the predetermined position/attitude $M^0_{VW}$, the viewpoint can be moved so as to place the virtual puck at the appropriate position on the real desk. Incidentally, it goes without saying that some of the above-mentioned approaches can be used in combination.

<Variation 4>

Although the above embodiments use the calibration grid 6000 to help place the viewpoint in the position/attitude $M^0_{VW}$, it is not always necessary to use a calibration grid: visual information alone can be used as a guide. It is also possible to place the viewpoint in the position/attitude $M^0_{VW}$ by placing the HMD 210L in an established attitude at an established position on the calibration grid 6000 instead of using visual information. Or any other method may be used as long as it leads the viewpoint to a predetermined position/attitude (or attitude).

<Variation 5>

Although the above embodiments have been applied to air hockey games, it goes without saying that they can be applied to systems that present mixed reality other than air hockey games. Besides, it is not that they are suitable only for coordinated work by two persons. They are also applicable to systems that present mixed reality to one or more than two workers (or players). They are not limited to systems that present mixed reality, but they can be used for any application that measure the position/attitude of the viewpoint of an imaging apparatus by means of magnetic sensors. Furthermore, they are not limited to the measurement of the position/attitude of the player's viewpoint described in relation to variation 2, but they can be used for applications that measure the position/attitude of any object whose position/attitude relative to the viewpoint of the imaging apparatus is known.

<Variation 6>

Although the above embodiments use magnetic sensors that employ AC magnetic fields, they are not limited to such magnetic sensors, but they can be applied to gyro-sensors, ultrasonic sensors, or any other sensors that can detect the position/attitude or attitude of a measuring object.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

The present invention includes a product, e.g., a printout, obtained by the image processing method of the present invention.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts (FIG. 6 and/or FIG. 9 and/or FIG. 10 and/or FIG. 11 and/or FIG. 15 and/or FIG. 17) described in the embodiments.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus that derives the calibration information needed to measure the position and/or orientation of a measuring object based on the output values of a position and/or orientation sensor, comprising:

a real image input unit, which is mounted on the measuring object, adapted to input a real image;

a virtual image generation unit adapted to generate a virtual image of indices using geometry information of the indices to be captured by said real image input unit, and a predetermined position and/or orientation of said measuring object;

a position and/or orientation sensor mounted directly or indirectly on the measuring object;

an input unit adapted to input a user's instruction indicating that a position and/or orientation, which changes according to movement of a mixed reality display device, of the indices on the real image input by said real image input unit has been matched with a position and/or orientation of the indices on the virtual image generated by said virtual image generation unit;

an acquisition unit adapted to acquire the output values from the position and/or orientation sensor according to the input by said input unit; and an operation unit adapted to derive the calibration information, based on the predetermined position and/or orientation and the output values of the position and/or orientation sensor acquired by said acquisition unit.

2. The information processing apparatus according to claim 1, wherein:

said position and/or orientation sensor outputs the output values that represent the position and/or orientation of said sensor itself in the sensor coordinate system; and said calibration information contains first coordinate transformation information for converting the position and/or orientation of said sensor itself in the sensor coordinate system into the position and/or orientation of said measuring object in the sensor coordinate system and second coordinate transformation information for converting the position and/or orientation in the sensor coordinate system into the position and/or orientation in a global coordinate system.

3. The information processing apparatus according to claim 1, further comprising guiding means for guiding said measuring object to said predetermined position and/or orientation.

4. The information processing apparatus according to claim 1, wherein said measuring object is the viewpoint of the user observing a display device that displays a virtual object superimposed over the real space transmitted optically through a display screen.

5. The information processing apparatus according to claim 1, wherein said real image input unit captures a real space, and said measuring object is the viewpoint of said real image input unit.

6. The information processing apparatus according to claim 1, wherein said indices have an area or volume in real space and said geometry information contains shape information of the indices.

7. The information processing apparatus according to claim 1, further comprising:

switching means for switching between a presentation mode that presents mixed reality and a derivation mode that derives calibration information.

8. The information processing apparatus according to claim 1, further comprising equipment for setting the position and/or orientation of the measuring object to initial states.

9. The information processing apparatus according to claim 2, wherein:

the measurement of said position and/or orientation is measurement of position and orientation, and said sensor is a position and orientation sensor; and said operation unit performs the process of determining orientation information among said first coordinate transformation information and position information among said second coordinate transformation information.

10. The information processing apparatus according to claim 2, wherein:

the measurement of said position and/or orientation is measurement of only orientation, and said sensor is an orientation sensor; and said operation unit performs the process of determining pitch-angle and roll-angle information among said first coordinate transformation information and yaw-angle information among said second coordinate transformation information.

11. The information processing apparatus according to claim 2, wherein:

the measurement of said position and/or orientation is measurement of only orientation, and said sensor is an orientation sensor; and said operation unit performs the process of determining yaw-angle information among said second coordinate transformation information.

12. The information processing apparatus according to claim 6, wherein the virtual image of the indices is a wire frame image.

13. An information processing method that derives the calibration information needed to measure the position and/or orientation of a measuring object based on the output values of a position and/or orientation sensor, comprising the steps of:

entering a real image derived from a real image input unit;

generating a virtual image of indices having a predetermined position and/or orientation;

inputting position and/or orientation information from the sensor when a position and/or orientation of the indices included in the real image matches a position and/or orientation of a virtual image of the indices; and generating calibration information from the inputted position and/or orientation information and predetermined position and/or orientation of the indices.

14. A computer-readable storage medium which stores the program code for executing the information processing method according to claim 13.

15. The information processing method according to claim 13, wherein there is a predetermined position relationship between said real image input unit and the measuring object, and the position and/or orientation of the indices included in the real image and the position and/or orientation of a virtual image of the indices are matched by changing a position and/or orientation of said real image input unit.

16. The information processing method according to claim 13, wherein the virtual image of the indices is a wire frame image.

17. An information processing method that derives the calibration information needed to measure the position and/or orientation of a measuring object based on the output values of a position and/or orientation sensor, which measures the position and/or orientation of the measuring object, comprising:

a generation step of generating images indicating indices to be observed on a display screen when a user observes the display screen at a position and/or orientation of a viewpoint determined in advance, based on the position and/or orientation of the viewpoint;

an input step of inputting a user's instruction indicating that indices in a real space and the images generated in the generation step are matched on the display screen;

an acquisition step of acquiring the output values from the position and/or orientation sensor according to the input in said input step; and a calculation step of calculating the calibration information, based on information indicating the position and/or orientation of the viewpoint and the output values of the position and/or orientation sensor acquired in said acquisition step.

18. The information processing method according to claim 17, wherein:

the position and/or orientation sensor is mounted on the measuring object directly or indirectly, and the output values of the sensor represent the position and/or orientation of the sensor itself in the sensor coordinate system; and the calibration information contains first coordinate transformation information for converting the position and/or orientation of the sensor itself in the sensor coordinate system into the position and/or orientation of the measuring object in the sensor coordinate system and second coordinate transformation information for converting the position and/or orientation in the sensor coordinate system into the position and/or orientation in a global coordinate system.

* * * * *

UNITED STATES PATENT AND TRADEMARK OFFICE

CERTIFICATE OF CORRECTION

PATENT NO. : 6,853,935 B2
DATED : February 8, 2005
INVENTOR(S) : Kiyohide Satoh et al.

It is certified that error appears in the above-identified patent and that said Letters Patent is hereby corrected as shown below:

Title page,
Item [56], References Cited, OTHER PUBLICATIONS,
"Hirokazu" reference, "Assocation," should read -- Association --.

Column 1,
Line 56, "user+s" should read -- user's --.

Column 4,
Line 64, "HMD" should read -- HMD. --.

Column 5,
Line 25, "head." should read -- heads. --.

Column 6,
Line 17, "give" should read -- given --.

Column 10,
Line 19, "$(V_{zx}-V_O)$" should read -- $(V_{zx}-V_O)|$ --.

Column 12,
Line 28, "methods" should read -- method --.

Column 15,
Line 61, "$M_{vs}^{-1}M°_{vw}$" should read -- $M_{vs}^{-1}•M°_{vw}$" --.

Column 17,
Line 44, "$Ry_{sv})$-1" should read -- $Ry_{sv})^{-1}$ --.

UNITED STATES PATENT AND TRADEMARK OFFICE

CERTIFICATE OF CORRECTION

PATENT NO. : 6,853,935 B2
DATED : February 8, 2005
INVENTOR(S) : Kiyohide Satoh et al.

It is certified that error appears in the above-identified patent and that said Letters Patent is hereby corrected as shown below:

Column 18,
Line 33, "provide" should read -- provides --.

Signed and Sealed this

Fifth Day of July, 2005

JON W. DUDAS
*Director of the United States Patent and Trademark Office*